(12) United States Patent
Aher et al.

(10) Patent No.: US 11,765,429 B2
(45) Date of Patent: Sep. 19, 2023

(54) SYSTEM AND METHOD TO IDENTIFY AND RECOMMEND MEDIA CONSUMPTION OPTIONS BASED ON VIEWER SUGGESTIONS

(71) Applicant: Rovi Guides, Inc., San Jose, CA (US)

(72) Inventors: Ankur Anil Aher, Maharashtra (IN); Charishma Chundi, Andhra Pradesh (IN); Reda Harb, Issaquah, WA (US)

(73) Assignee: Rovi Guides, Inc., San Jose, CA (US)

( * ) Notice: Subject to any disclaimer, the term of this patent is extended or adjusted under 35 U.S.C. 154(b) by 0 days.

(21) Appl. No.: 17/977,337

(22) Filed: Oct. 31, 2022

(65) Prior Publication Data

US 2023/0156275 A1 May 18, 2023

Related U.S. Application Data

(63) Continuation of application No. 17/348,637, filed on Jun. 15, 2021, now Pat. No. 11,523,176.

(51) Int. Cl.
*H04N 21/485* (2011.01)
*H04N 21/442* (2011.01)
(Continued)

(52) U.S. Cl.
CPC ....... *H04N 21/485* (2013.01); *G06F 3/04842* (2013.01); *H04N 21/25883* (2013.01); *H04N 21/25891* (2013.01); *H04N 21/4223* (2013.01); *H04N 21/42203* (2013.01); *H04N 21/44204* (2013.01); *H04N 21/44218* (2013.01); *H04N 21/4532* (2013.01)

(58) Field of Classification Search
CPC ....... H04N 21/25891; H04N 21/44204; H04N 21/25883; H04N 21/42203; H04N 21/4223; H04N 21/44218; H04N 21/4532; G06F 3/04842
See application file for complete search history.

(56) References Cited

U.S. PATENT DOCUMENTS 10,951,852 B1   3/2021   Senapati
11,523,176 B1   12/2022  Aher et al.
(Continued)

OTHER PUBLICATIONS

U.S. Appl. No. 17/348,626, filed Jun. 15, 2021, Ankur Anil Aher.
U.S. Appl. No. 17/348,637, filed Jun. 15, 2021, Ankur Anil Aher.

*Primary Examiner* — John R Schnurr
(74) *Attorney, Agent, or Firm* — Haley Guiliano LLP

(57) ABSTRACT

Systems and methods for determining, based on recommendations provided by users that have consumed a media asset, which consumption options may be configured on a media device such that when configured enhance the user viewing experience for a specific media asset. The method includes accessing comments posted by other users that have consumed the media asset. The comments are analyzed to determine a consumption option recommendation. If the number of comments meet a threshold value, then the system either automatically configures the media device or configures the media device upon user approval with the recommended consumption option. The recommendation to configure a consumption option on the media device is made only if the recommendation is supported by the media device. The system also detects through audio and image analysis which users are consuming the media asset and accordingly configures the consumption options to their preferences.

20 Claims, 16 Drawing Sheets

(51) Int. Cl.
   *H04N 21/45*     (2011.01)
   *H04N 21/258*    (2011.01)
   *H04N 21/4223*   (2011.01)
   *G06F 3/04842*   (2022.01)
   *H04N 21/422*    (2011.01)

(56) References Cited

U.S. PATENT DOCUMENTS

| | | |
|---|---|---|
| 2007/0033607 A1 | 2/2007 | Bryan |
| 2008/0244655 A1 | 10/2008 | Mattila et al. |
| 2009/0210898 A1 | 8/2009 | Childress et al. |
| 2013/0287365 A1 | 10/2013 | Basapur et al. |
| 2015/0113552 A1 | 4/2015 | Chang et al. |
| 2015/0264432 A1 | 9/2015 | Cheng |
| 2017/0070779 A1 | 3/2017 | Kim et al. |
| 2017/0188070 A1 | 6/2017 | Abed |
| 2019/0327526 A1 | 10/2019 | Navin et al. |
| 2019/0335249 A1 | 10/2019 | Shimy et al. |
| 2019/0394529 A1 | 12/2019 | Hou |
| 2020/0351566 A1 | 11/2020 | Yelton |
| 2021/0125054 A1 | 4/2021 | Banik et al. |
| 2021/0136447 A1 | 5/2021 | Daw et al. |
| 2021/0274261 A1 | 9/2021 | Sato et al. |
| 2022/0400301 A1 | 12/2022 | Aher et al. |

| Factor Recommendations | Approve | Reject |
|---|---|---|
| Brightness up to level 7? | ✓ | |
| Volume at 18? | | X |
| Skip Intro Credits? | | X |
| Move display to 4K TV? | ✓ | |

FIG. 9

SYSTEM AND METHOD TO IDENTIFY AND RECOMMEND MEDIA CONSUMPTION OPTIONS BASED ON VIEWER SUGGESTIONS

CROSS-REFERENCE TO RELATED APPLICATIONS

This application is a continuation of U.S. patent application Ser. No. 17/348,637, filed Jun. 15, 2021, the disclosure of which is hereby incorporated by reference herein in its entirety.

FIELD OF INVENTION

Embodiments of the present disclosure relate to identifying, recommending, and implementing media consumption options on a media device based on viewer recommendations, user profile, and user consumption pattern.

BACKGROUND

Media assets, such as movies, sit-coms, episodes of a series, and foreign language video assets, are offered for consumption through numerous online platforms. To name a few, these include streaming media suppliers, such as Netflix, Hulu, or Amazon, or video content sharing platforms, such as YouTube, or other mobile and social media applications, such as TikTok, and Facebook. (Netflix is a trademark owned by Netflix Inc., Amazon is trademark owned by Amazon Technologies, Inc, Facebook is a trademark owned by Facebook, Inc., YouTube is a trademark owned by Google Inc, Hulu is a trademark owned by Hulu, LLC, and TikTok is a trademark owned by ByteDance Ltd.)

Content creators that create and produce media assets include established and well-known large production companies, such as $20^{th}$ Century Studios, DreamWorks, Netflix and smaller to medium size content creation companies that are located in all parts of the world. ($20^{th}$ Century Studios is a trademark owned by Fox Media LLC and DreamWorks is a trademark owned by DreamWorks Animation L.L.C). Content creators that create or produce media assets also include individuals that are experienced as well as individuals that are creating their first content. The media assets created by such diverse groups of individuals and companies across the world is also diverse in several aspects. For example, the picture resolution, speech and audible sounds, brightness, contrast, quality of production, subtitles used, vary from one media asset to another. In terms of quality of the media asset, at times, the variations are dependent upon experience of the content creator and other times they are dependent upon budget and equipment used in creating the content. Even the same content creator may generate media assets that vary in their presentation.

Although the media assets, their quality, presentation, and various factors associated with the media asset vary, current methods allow a viewer to view all media assets in the same manner. For example, a viewer consuming a media asset that has darker lighting background in its scenes and English subtitles due to its foreign language content watches a different media asset made in English having brighter lighting background the same way. If the user desires to change any of the viewing factors, also referred to herein as consumption options, such as brightness, the user manually navigates through a plurality of media device functionality to change a factor, such as brightness, to their liking. As such, the current methods make is cumbersome for a user to change a factor when they desire to watch the media asset in a manner that is suitable and comfortable for them.

If the user desires to adjust the same viewing factor, or another factor, for another media asset after having adjusted the same viewing factor in a previously watched media asset, the user must repeat the cumbersome steps and reconfigure the media device to view the media asset in a desired manner.

Additionally, in some instances, the user is not aware what is the best viewing recommendation for watching a particular media asset and not knowing such information ends up watching the media asset in a manner that may not provide the best experience.

As such, there is a need for a system and method to overcome at least the above-mentioned challenges and provide a higher viewing experience that is suitable and personalized for each user.

BRIEF DESCRIPTION OF THE DRAWINGS

The various objects and advantages of the disclosure will be apparent upon consideration of the following detailed description, taken in conjunction with the accompanying drawings, in which like reference characters refer to like parts throughout, and in which:

FIG. 9 depicts an exemplary configuration recommendation provided to the user for selection, in accordance with some embodiments of the disclosure;

DETAILED DESCRIPTION

Figure 1:
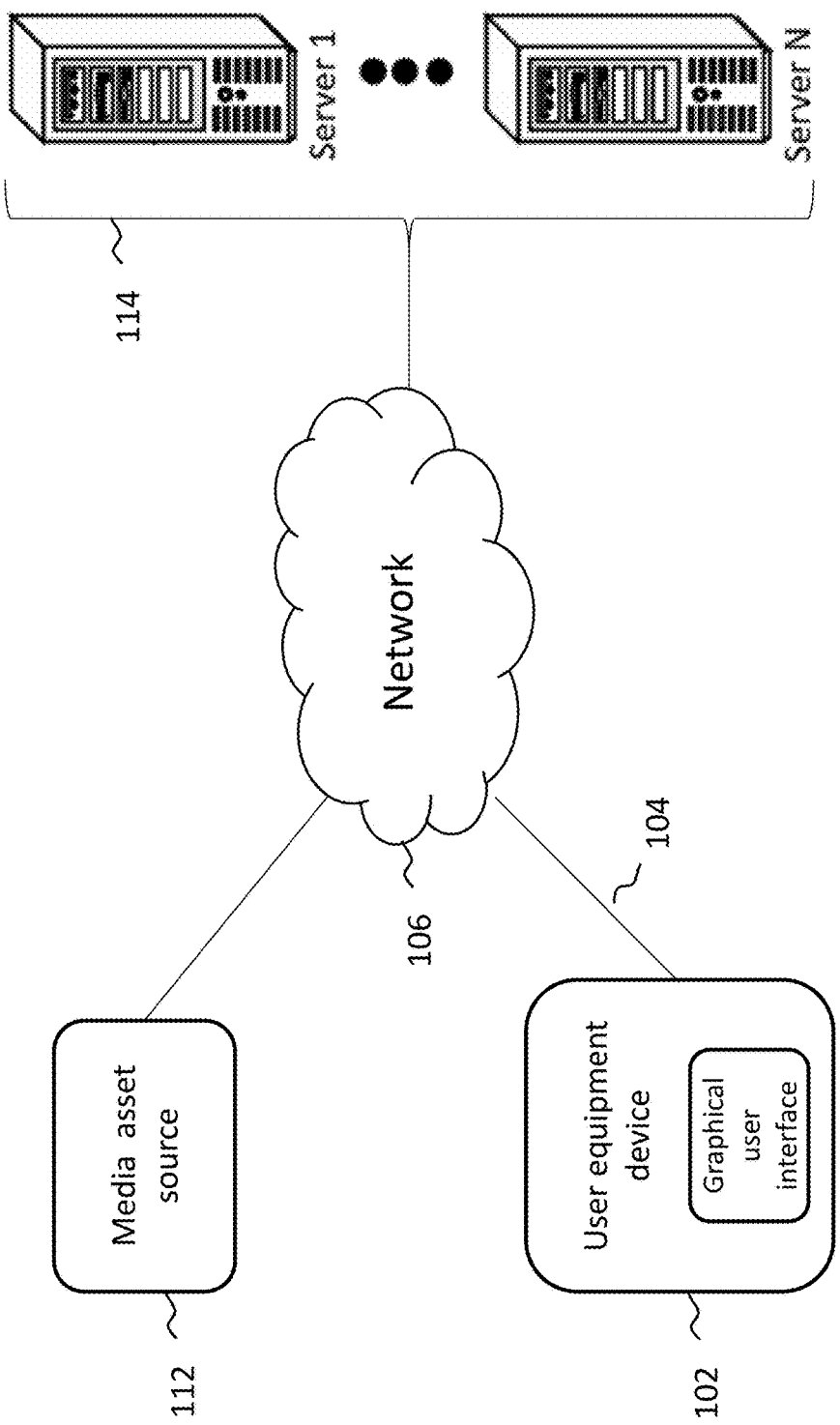
FIG. 1 is a block diagram of an exemplary system for identify comments, making configuration recommendations, and configuring a media device, in accordance with some embodiments of the disclosure.

In accordance with some embodiments disclosed herein, the above-mentioned limitations are overcome by obtaining recommendations from viewers that have consumed the media asset on the recommended or best viewing configuration for watching the media asset. In addition to determining viewing configuration based on recommendations from other users, viewing configuration can also be obtained based on viewing preferences listed in the user's profile and/or system generated viewing recommendations based on user's consumption pattern.

In some embodiments, a request to display a media asset is detected. In response to the request, the system determines the best viewing configuration for the media asset for providing an enhanced viewing experience to the user. In other embodiments, the media asset may be placed in a playlist or scheduled for later consumption and the system determines the best viewing configuration for the media assets that are placed in the playlist or scheduled for later consumption.

The method for determining the viewing configuration includes accessing an online platform where the media asset is provided to a plurality of users. The system searches for comments made by the plurality of users that are on that platform. The comments made are associated with the media asset. If the platform is a public platform, then the comments are publicly posted by the online platform, and if the platform is a private platform, then the comments are posted by the private platform to a plurality of users that are authorized to access the private platform.

The system analyzes the posted comments to select a subset of comments that relate to a consumption option. As referred to herein, consumption option, factor recommendations, viewing preference, and media device configuration are used interchangeably and refer to a configurable feature or option associated with the media device that can be configured and once configured can be applied to a specific media asset such that the display of the media asset incorporates the configured option. Some examples of configurable consumption options include, brightness, contrast, volume, closed captions ON/OFF, picture-in-picture, display resolution and parental controls. Since each media device may have different consumption options, the comments made by the plurality of users, that are posted on the platform, are made in reference to a consumption option that was available on the media device used by each of the plurality of users to consume the media asset.

In some embodiments, the system accesses the comments made by the plurality of users. The comments may relate to a recommendation for a consumption option or generally to the media asset. The system parses through the comments to select those comments that provide a recommendation for a consumption option. The parsing of the comments may be performed by using natural language processing (NLP) algorithms.

The comments that provide a recommendation for configuring a consumption option are then processed and evaluated to determine whether the recommendations should be incorporated by configuring the consumption options on the media device. Prior to processing the recommendations and configuring the media device, the system determines whether the media device associated with the user has the capability that allows such a recommendation to be configured. For example, if a recommendation made by another user on the platform is to watch the media asset in 4K resolution, and the media device associated with the user does not have the feature capability to display a 4K resolution quality image, then the system discards the recommendation and does not analyze it further as it cannot be implemented in the user's media device.

The selected subset of comments that relate to a consumption option are scored and evaluated for relevance. The scoring consists of counting the number of comments that recommend the same consumption option. For example, if "watch the media asset at 1.25× speed" comment was made by 78 users, a score of 78 would be associated with the consumption option for 1.25× speed. In some embodiments, the comments are grouped into distinct pairs which are contextually related prior to being scored. For example, the following comments made: "Watch in English," "Its best to watch in English," "You can watch in Spanish but it's better that you watch in English," "watch in Spanish," "debe mirar en español" (which means, "must watch in Spanish" in English), are grouped together as distinct pairs where Group 1 includes all comments associated with the context of watching the media asset in English and Group 2 includes all comments associated with the context of watching the media asset in Spanish. If the comments are made in another language, language translation and NLP algorithms may be used to translate the comments to a common language of the other comments and then scored as mentioned above.

The system determines if the number of comments that recommend a consumption option meet a threshold value, which is a number that is predetermined by the system or the user. The threshold value ensures that the recommendation for the consumption option is made by a number of users that have consumed the media asset and it is not an outlier opinion by a single user or multiple users that may not be shared by a larger group of users.

If the number of comments that recommend a consumption option meet the threshold value, then the consumption option is displayed for selection to the user on a user interface. The user may select or reject the recommendation as desired. If selected, then the consumption option is configured on the media device and applied to the media asset during playback.

The consumption option may also be time, location, or segment based. For example, the consumption option may only apply during a certain time of day, a specific segment(s) of the media asset or apply only if the user is located in certain geographies or within a proximate distance from the plurality of users that recommended the consumption option. Some examples of location-based consumption options include a non-Spanish speaking user recommending turning ON English subtitles for a media asset that uses Spanish language. If the consumption option is being evaluated for someone who lives in Mexico and is a fluent Spanish speaker, then due to the location of the user who will be consuming the asset, the recommendation will not be implemented on their media device. Likewise, if a configuration is to be applied only to a certain segment of a media asset, a recommendation to lower the volume during a segment of the media asset where a loud action scene is being played will not be implemented in other segments of the media asset where the media asset volume level is lower.

In some embodiments, the online platform on which the media asset is provided to the user may not have any comments that relate to the media asset or may not have the number of comments that recommend a consumption option. In the event the comments are not available, or not enough comment are available, the system searches other online platforms to determine if the platform includes comments that recommend consumption options for the media asset. If comments related to the media asset are discovered by the search, then the system obtains the comments from the other online platforms. The comments obtained from other platforms as well as any comments from the current platform are counted to determine a total comment count. This count is then evaluated to determine it meets the threshold count.

If the threshold count is still not met, the system may use other methods, such as crowd sourcing, or defining a user group based on shared characteristics between users, to obtain additional comments. In this embodiment, the system transmits a survey to the users of the crowd sourced network or defined user group to determine whether the users would recommend a particular consumption option. In one embodiment, the survey may be a targeted survey that displays a consumption option. The consumption option may be displayed on a user interface for user approval or rejection. In another embodiment, the survey may be a broader survey that allows the users to provide comments on any consumption options for the media asset.

In some embodiments, the system may also determine a consumption option based on the user profile of the user who will be consuming the media asset. In this embodiment, the system may identify the individual who is watching the media asset. As such, in a household of mom, dad, son, and daughter, the system may distinguish between them based on their user profiles. It may do so by performing audio and/or image analysis of the user. For example, the system may invoke the camera associated with the media device and perform facial recognition matching with the user that in the range of the camera with a stored facial profile of the user, or users from the same household. The system may also match the voice of the user with an audio signature stored of the user, or users from the same household. Based on a match of user voice or image with a voice signature or image stored in database, the system may identify the user or users that are watching the media asset and access their profiles to fetch their consumption option preferences. In an embodiment where multiple users are watching the media asset, the system may access the profiles of each user and configure the media asset based on the preferences in their profiles. In the event there is a conflict in a preference for a consumption option, for example, a first user prefers to watch is at 1.25× speed and the second user prefers to watch it at 1.5× speed, then both consumption options are displayed for user selection and a consumption option selected by the users is used to configure the media device. Additionally, if the system detects that a child is watching the media asset, then the system may automatically configure the media asset to turn on parental control.

Figure 2:
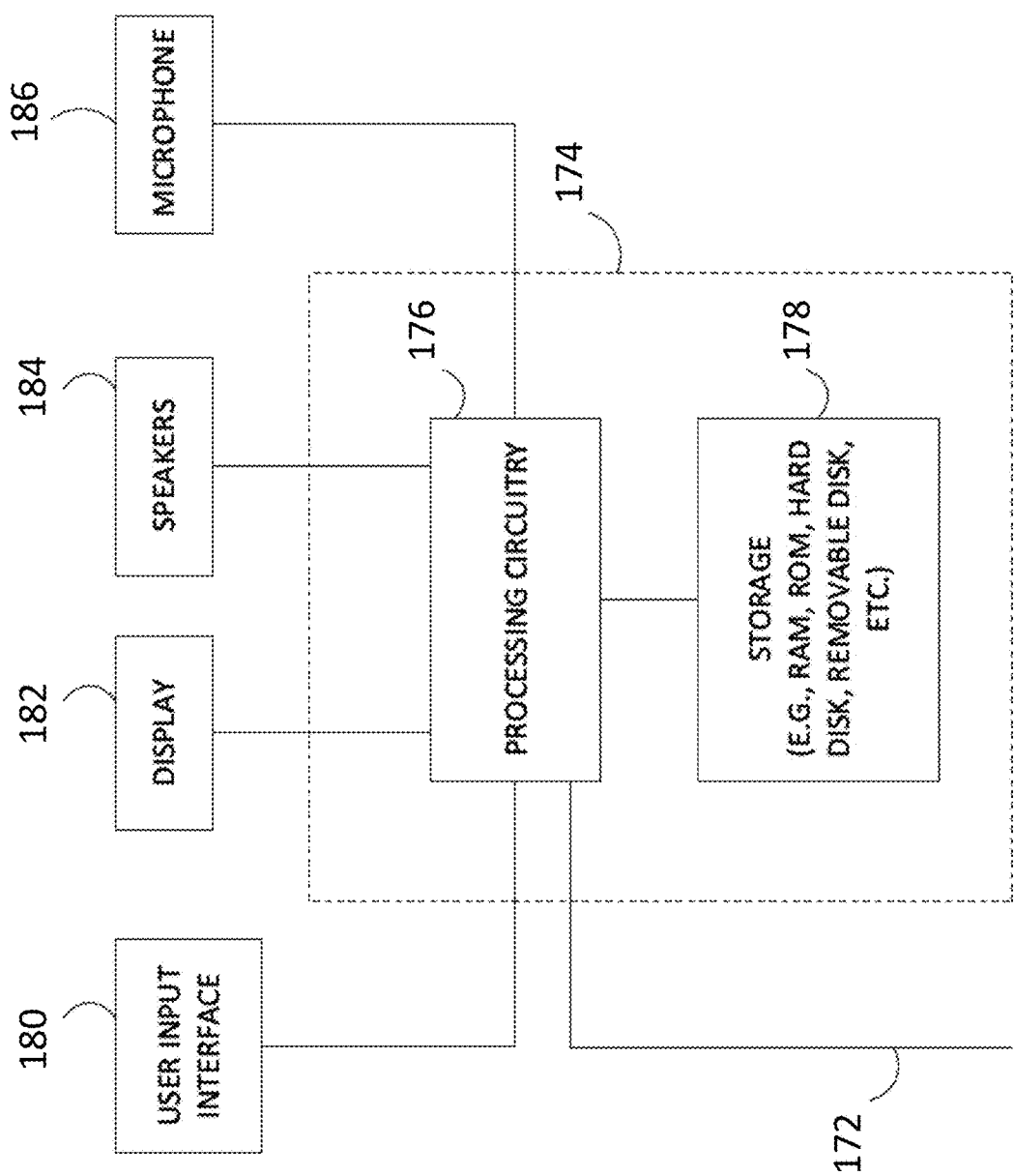
FIG. 2 is a block diagram of a generalized media device, in accordance with some embodiments of the disclosure.

FIGS. 1-2 describe exemplary devices, systems, servers, and related hardware for accessing various online platforms, accessing comments posted on the online platforms, accessing user profile, generating machine learning model based on user consumption history, analyzing comments to associate instructions for a media device, configuring the media device with consumption options, determining consumption options when multiple users are consuming a media asset, and executing all the processes described herein, in accordance with some embodiment of the disclosure. In the system 100, there can be more than one user equipment device 102 but only one is shown in FIG. 1 to avoid overcomplicating the drawing. In addition, a user may utilize more than one type of user equipment device and more than one of each type of user equipment device. In an embodiment there may be paths between user equipment devices, so that the devices may communicate directly with each other via communications paths, as well as other short-range point-to-point communications paths, such as USB cables, IEEE 1394 cables, wireless paths (e.g., Bluetooth, infrared, IEEE 802-11x, etc.), or other short-range communication via wired or wireless paths. BLUETOOTH is a certification mark owned by Bluetooth SIG, INC. In an embodiment, the user equipment devices may also communicate with each other directly through an indirect path via the communications network 106.

The user equipment devices may be coupled to communications network 106. Namely, the user equipment device 102 is coupled to the communications network 106 via communications path 104. The communications network 106 may be one or more networks including the Internet, a mobile phone network, mobile voice or data network (e.g., a 4G, 5G, or LTE network), cable network, public switched telephone network, or other types of communications network or combinations of communications networks. The path 104 may separately or in together with other paths include one or more communications paths, such as, a satellite path, a fiber-optic path, a cable path, a path that supports Internet communications (e.g., IPTV), free-space connections (e.g., for broadcast or other wireless signals), or any other suitable wired or wireless communications path or combination of such paths. In one embodiment path 104 can be a wireless path. Communication with the user equipment device may be provided by one or more communications paths but is shown as a single path in FIG. 1 to avoid overcomplicating the drawing.

The system 100 also includes media asset sources, such as video asset sources 112, and one or more servers 114, which can be coupled to any number of databases providing information to the user equipment devices. The information sources 112 represent any computer-accessible sources, such as servers, databases, platforms (such as video sharing platforms) that store media assets, such as video assets. The server 114 may store and execute various software modules, such as for example for obtaining comments, associating them with consumption option instructions, and transmitting the instructions to a media device. In some embodiments, the user equipment device 102, media asset sources 112, and server 114 may store metadata associated with media assets. In some embodiments, the server may transmit a command to cause the display of a user interface on the display screen of a media asset device or a user's mobile device. The user interface may be used by the user to select preferences, execute commands, and approve or reject consumption options. The user interface may also be used by the system to display consumption option surveys, obtain user preferences, or obtain user profile or user consumption history.

FIG. 2 shows a generalized embodiment of a user equipment device 200, in accordance with one embodiment. In an embodiment, the user equipment device 200, is the same user equipment device 102 of FIG. 1. The user equipment device 200 may receive content and data via input/output (I/O) path 202. The I/O path 202 may provide audio content (e.g., broadcast programming, on-demand programming, Internet content, content available over a local area network (LAN) or wide area network (WAN), and/or other content) and data to control circuitry 204, which includes processing circuitry 206 and a storage 208. The control circuitry 204 may be used to send and receive commands, requests, and other suitable data using the I/O path 202. The I/O path 202 may connect the control circuitry 204 (and specifically the processing circuitry 206) to one or more communications paths. I/O functions may be provided by one or more of these communications paths but are shown as a single path in FIG. 2 to avoid overcomplicating the drawing.

The control circuitry 204 may be based on any suitable processing circuitry such as the processing circuitry 206. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor).

The accessing of various online platforms, accessing comments posted on the online platforms, accessing user profile, generating machine learning model based on user consumption history, analyzing comments to associate instructions for a media device, configuring the media device with consumption options, determining consumption options when multiple users are consuming a media asset, and executing all the processes described herein can be at least partially implemented using the control circuitry 204. The processes as described herein may be implemented in or supported by any suitable software, hardware, or combination thereof. They may also be implemented on user equipment, on remote servers, or across both.

In client-server-based embodiments, the control circuitry 204 may include communications circuitry suitable for communicating with one or more servers that may at least implement the storing of the media assets, consumption options, user profiles, machine learning and artificial intelligence programs, caption files, user comments posted on online platforms, and related functions and processes as described herein. The instructions for carrying out the above-mentioned functionality may be stored on the one or more servers. Communications circuitry may include a cable modem, an integrated service digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of user equipment devices, or communication of user equipment devices in locations remote from each other (described in more detail below).

Memory may be an electronic storage device provided as the storage 208 that is part of the control circuitry 204. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid-state devices, quantum storage devices, gaming consoles, gaming media, or any other suitable fixed or removable storage devices, and/or any combination of the same. The storage 208 may be used to store various types of content described herein. Nonvolatile memory may also be used (e.g., to launch a boot-up routine and other instructions). Cloud-based storage, described in relation to FIG. 1, may be used to supplement the storage 208 or instead of the storage 208.

The control circuitry 204 may include audio generating circuitry and tuning circuitry, such as one or more analog tuners, audio generation circuitry, filters or any other suitable tuning or audio circuits or combinations of such circuits. The control circuitry 204 may also include scaler circuitry for upconverting and down converting content into the preferred output format of the user equipment device 200. The control circuitry 204 may also include digital-to-analog converter circuitry and analog-to-digital converter circuitry for converting between digital and analog signals. The tuning and encoding circuitry may be used by the user equipment device 200 to receive and to display, to play, or to record content. The circuitry described herein, including, for example, the tuning, audio generating, encoding, decoding, encrypting, decrypting, scaler, and analog/digital circuitry, may be implemented using software running on one or more general purpose or specialized processors. If the storage 208 is provided as a separate device from the user equipment device 200, the tuning and encoding circuitry (including multiple tuners) may be associated with the storage 208.

The user may utter speech to the control circuitry 204, which is received by the microphone 216. The microphone 216 may be any microphone (or microphones) capable of detecting human speech. The microphone 216 is connected to the processing circuitry 206 to transmit detected voice commands and other speech thereto for processing. In some embodiments, voice assistants (e.g., Siri, Alexa, Google Home and similar such voice assistants) receive and process the voice commands and other speech.

The user equipment device 200 may include an interface 210. The interface 210 may be any suitable user interface, such as a remote control, mouse, trackball, keypad, keyboard, touch screen, touchpad, stylus input, joystick, or other user input interfaces. A display 212 may be provided as a stand-alone device or integrated with other elements of the user equipment device 200. For example, the display 212 may be a touchscreen or touch-sensitive display. In such circumstances, the interface 210 may be integrated with or combined with the microphone 216. When the interface 210 is configured with a screen, such a screen may be one or more of a monitor, a television, a liquid crystal display (LCD) for a mobile device, active matrix display, cathode ray tube display, light-emitting diode display, organic light-emitting diode display, quantum dot display, or any other suitable equipment for displaying visual images. In some embodiments, the interface 210 may be HDTV-capable. In some embodiments, the display 212 may be a 3D display.

The speaker (or speakers) 214 may be provided as integrated with other elements of user equipment device 200 or may be a stand-alone unit. In some embodiments, the display 212 may be outputted through speaker 214.

The user equipment device 200 of FIG. 2 can be implemented in system 100 of FIG. 1 as user equipment device 102, but any other type of user equipment suitable for accessing various online platforms, accessing comments posted on the online platforms, accessing user profile, generating machine learning model based on user consumption history, analyzing comments to associate instructions for a media device, configuring the media device with consumption options, determining consumption options when multiple users are consuming a media asset, and executing all the processes described herein.

It may also be implemented in system 100 as user equipment device 102, but any other type of user equipment suitable for executing the functions and processes described herein. For example, user equipment devices such as television equipment, computer equipment, wireless user communication devices, or similar such devices may be used. User equipment devices may be part of a network of devices. Various network configurations of devices may be implemented and are discussed in more detail below.

Figure 3:
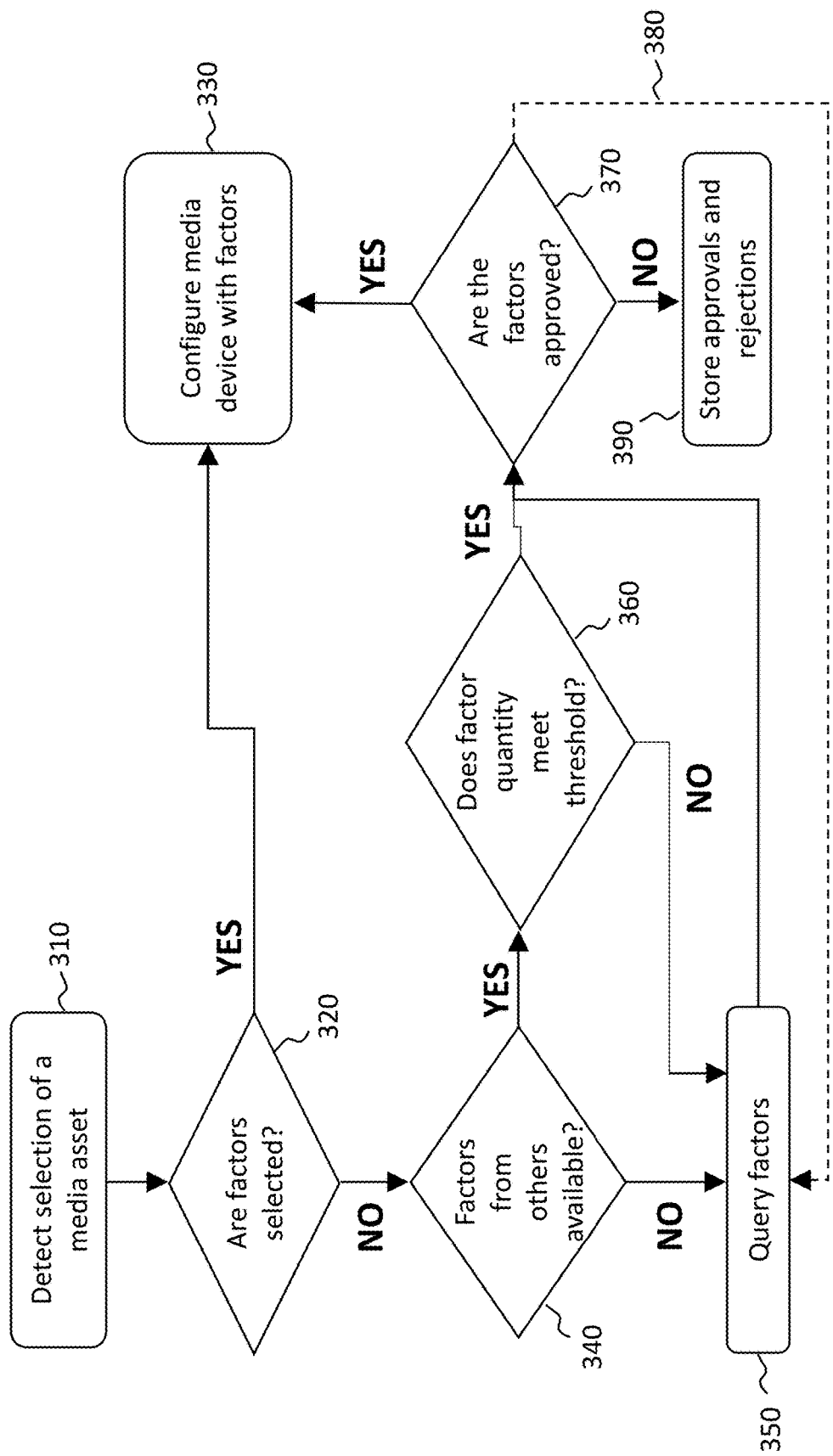
FIG. 3 is flowchart of a process for identifying, recommending, and implementing consumption options, in accordance with some embodiments of the disclosure.

FIG. 3 is flowchart of a process for identifying, recommending, and implementing consumption options, in accordance with some embodiments of the disclosure. The process provides configurations of consumption options, also referred to as factors or viewing factors, and allows playback of the media asset that is user friendly and personalized to the viewer's environment. The process can either be fully automated where it automatically configures the media asset with a configuration, or the process may provide the user a recommendation that can be approved. If the recommendation is approved, then the consumption option is configured on the media device for an enhanced and personalized viewing experience. The process also stores user behavior and preferences such that a user consumption model can be generated and trained over a period of time. The trained model can be applied to subsequent consumption of media assets such that consumption options configured for a previous media asset can also be configured for a related subsequently consumed media asset.

The process 300 begins at block 310. In one embodiment, at block 310, a media asset is selected. The media asset may be a movie, episode, documentary, or animation. The media asset may also be a television show, a movie, a documentary, a new segment, a website page, a music album, a song, a work tutorial, an educational seminar, or any other type of audio or video asset.

The system may detect a selection of the media asset by receiving an indication from a media device. The indication may be in response to a media asset selection made by a user using a user interface. The indication may also be system generated to signal that a media asset is being displayed. Although the process begins at block 310 when a media asset is selected, in another embodiment, the process may also begin if a) the media asset is scheduled for later viewing, b) an indication is received from a device or account used by the user that the user is likely going to consume the media asset, c) the media asset is placed in a playlist, or d) the system detects that the media asset is related to another media asset consumed, such as an episode of a series, a sequel, and the user is likely to consume the media asset since another related media asset was already consumed by the user.

At block 320, a determination is made whether a consumption option (also referred to as factor) has been selected. As used herein, a factor includes all controls and functionality provided via a media device on which the media asset will be consumed. For example, the media device may be mobile phone, a tablet, a gaming device, a desktop or a laptop computer, a television, a smart television or display, or another type of electronic device that allows consumption of a media asset. The consumption options/factors vary by the device and include, for example, brightness, volume, captions ON/OFF etc. The consumption options may also be related to navigating through the media asset, such as forwarding, skipping a section, such as credits etc. Additional details on viewing factors are provided in the description of FIG. 8.

The determination at block 320 involves querying the user profile to determine if the user has provided their preferences for consumption options. For example, the user profile may indicate that the user likes to watch a certain type of media assets with factors 1, 2, and 3 configured a certain way and another type of media asset with a different factor configuration. The user may have stored factor preferences in their user profile that are broad apply to the entire media asset and/or the user may have stored factor preferences in their user profile that are targeted to specific category, genre, or segment of the media asset.

In addition to the user profile, in another embodiment, the factors may have been configured prior to, or during, the consumption of the media asset by the user. When such a configuration is performed, the systems described in FIGS. 1-2 receive a signal of the factor configured on the media device and in response the system stores a list of all configurations made to the media device.

In yet another embodiment, the system may automatically populate the user profile with certain factor configurations based on the user's consumption history. For example, the system may record viewing factors that were used, accepted, or configured by the user for a previous media asset consumption. The system may analyze whether the factors used, accepted, or configured by the user for the prior consumption apply to the current media asset. For example, the system may generate a consumption or behavior pattern model that is continuously trained based on media asset consumption and use the model to predict whether the current media asset falls within the pattern such that the prior factors may be applied to the current media asset.

If a determination is made at block 320 that a consumption option has been selected by the user or by the system based on the consumption pattern of the user, then the media device is configured with the consumption options that were selected. For example, if one of the consumption options selected is "Closed Captions ON," then the media device is automatically configured to turn ON closed captions during the consumption of the media asset.

In another embodiment, even though a consumption option is selected and subsequently configured for the media device, the system may further explore additional consumption options that can be configured at the media device.

If a determination is made at block 320 that a consumption option/factor has not been selected by the user or by the system based on the consumption pattern of the user, then at block 340, the system determines if there are comments, ratings, or other forms of feedback associated with the media asset are available. For simplicity, rating, posts, feedback, likes, thumbs up/down, stars ratings, 1-10 ratings, and all other forms of feedback associated with the media asset, or any factors of the media asset will collectively be referred to as comments.

The system may query the platform where the media asset is provided for consumption, such as Netflix, and determine if there is any metadata, comments, ratings, or other forms of feedback already provided for the media asset. For example, the platform may allow viewers of the media asset, regardless of their location or connection to the current viewer, to post comments, rating, or other forms of feedback relating to the media asset. As such, other viewers who have consumed the media asset may post comments on a particular consumption option/factor, a plurality of factors, or other feedback relating to either a specific consumption option or the media asset as a whole. The comments, ratings, and feedback posted by other users relate to recommendations on what factors are to be configured such that the user can have the best viewing experience for the specific media asset that is to be consumed.

At block 340, if the system determines that comments that recommend a factor that can be configured on the media device are not available, then the system queries the factors at block 350. In another embodiment, if comments on some of the factors are available but not on all the factors that can be configured on the media device, then the system queries the factors at block 350.

In one embodiment, querying for comments involves accessing various platforms that provide same media asset access for consumption. Once the comments are obtained, they are analyzed by utilizing natural language processing algorithms to associate them with a factor recommendation. These recommendations are provided to the user for selection and if selected are configured on the media device that will be used to consume the media asset. The factor recommendation may either be configured automatically on the media device that is used for consuming the media asset or a recommendation may be provide on a selectable user interface such that once the recommendation is approved, the media device is configured with the factor recommendation.

Figure 4:
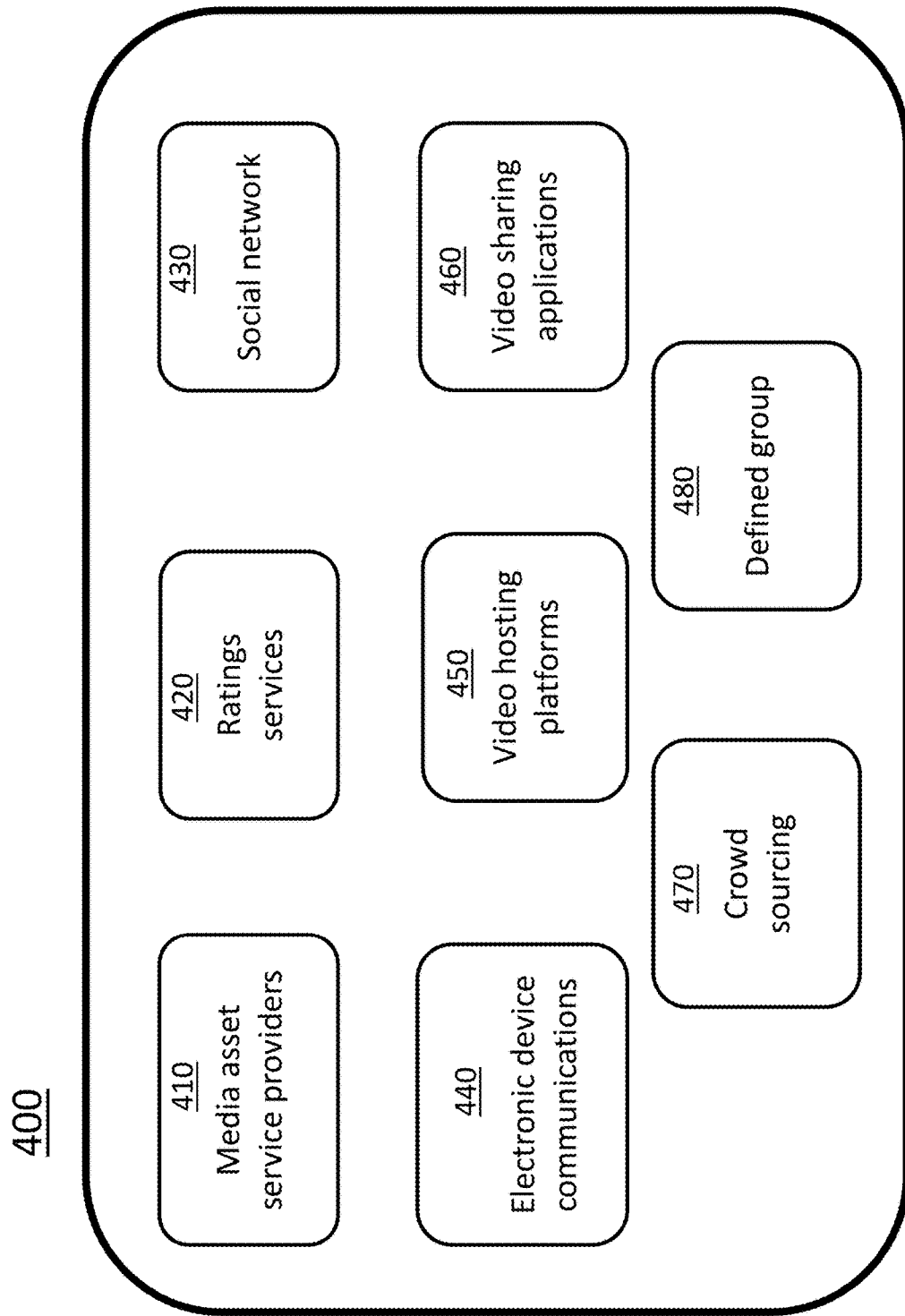
FIG. 4 is a block diagram of a plurality of exemplary sources through which factors recommendations may be obtained, in accordance with some embodiments.

FIG. 4 is a block diagram of a plurality of exemplary sources through which factors recommendations may be obtained, in accordance with some embodiments. Although a few exemplary sources are described, the embodiments are not so limited and additional sources can also be used.

In one embodiment, comments that recommended factors can be obtained from the platforms of media asset service providers 410. These include services such as Netflix, Hulu, or Amazon. In this embodiment, the system would search the platform for the same media asset that is being consumed or will be consumed by the user. If the same media asset is found on the platforms, then the system determines if there are comments posted on the platform that recommend one or more factor for displaying the media assets. If so, the comments may be analyzed such that they can be presented to the user in form of a recommendation. In another embodiment, the system may automatically configure the media device with the factor recommendation instead of providing it as a selection option to the user.

In another embodiment, factor recommendations can be obtained from the rating services 420. These include services such as Rotten Tomatoes, FilmRatings.com, Yahoo Movies, Roger Ebert. (Rotten tomatoes is a trademark owned by Fandango Media LLC, Yahoo Movies in a trademark owned by Oath, Inc, and Roger Ebert is a trademark owned by The Ebert Company, Ltd.) In this embodiment, the system would search the ratings website for ratings associated with the media asset that is being consumed or will be consumed by the user. If ratings for the same media asset are found on the ratings website, then the ratings, and any comments posted for the media asset on the ratings website will be analyzed. The comments and ratings will be associated with specific consumption options and either presented to the user for approval or automatically configured on the media device.

In another embodiment, factor recommendations can be obtained from the social media websites 430 and platforms. These include platforms such as Facebook, Twitter, Instagram, Reddit. (Facebook is a trademark owned by Facebook, Inc., Twitter is a trademark owned by Twitter, Inc, Instagram is a trademark owned by Instagram, LLC, and Reddit is a trademark owned by Reddit, Inc). In this embodiment, the system would search the social media websites for comments associated with the media asset that is consumed or will be consumed by the user. Since social media websites may include numerous comments, artificial intelligence algorithms may be used to search and cull through the large volume of comments and search for specific comments that are associated with the media asset that will be consumed by the user. In another embodiment the media asset producer or company that owns the media asset may have its own page on a social media website and have comments related to all the media assets produced by the company listed on its page.

In yet another embodiment the system may be provided access to the user's social media accounts. The system may search within the circles associated with the user, such as first-degree or second-degree circles, to determine if anyone in the user circle has posted comments relating to the media asset. As such, the system may search for comments from contacts that are connected to the user as well as comments from other users that are not connected to the user. If comments for the same media asset are found on the social media website, then the comments may be obtained, analyzed by using NLP algorithms, and associated with specific factor configuration recommendations and either presented to the user for approval or automatically configure on the media device.

In another embodiment, factor recommendations can be obtained from electric communication devices 440 associated with the user. These include comments posted to the user, or by the user, on electronic devices associated or owned by the user. For example, the user may be associated with a mobile phone, a tablet, a gaming device, laptop computer, or another type of electronic communication device. The comments to and from such devices may be through SMS and MMS texts, postings, messages, emails etc. In this embodiment, a system would be provided access to user's electronic devices and the system would search user communications on electronic devices associated with the user to determine if any of the communications relate to the media asset that is consumed or will be consumed by the user. If the system discovers comments related to the media asset, then the comments are analyzed using NLP algorithms, or other processes, and be associated with specific factor configuration recommendations and either presented to the user for approval or automatically configured on the media device.

In another embodiment, factor recommendations can be obtained from video hosting platforms 450. These include video hosting platforms such as YouTube, Vimeo, or those that host videos of educational materials, including private cloud servers that may host videos that are confidential for company's employees. (YouTube is a trademark owned by Google LLC, and Vimeo is a trademark owned by Vimeo, Inc). Some video hosting platforms may require a user that is uploading media content to provide information relating to the media asset. For example, some video hosting platforms may have a template that needs to be filled before a media asset can be uploaded. In this embodiment, a system would search all metadata associated with a media asset, which includes video hosting platform system generated metadata and any metadata provided during the uploading of the media asset. It would also search all the comments provided for the media asset by the plurality of users of the platform. Once the same media asset that is being consumed is identified at the video sharing platform, the metadata and comments associated with the media asset may be analyzed using NLP algorithms, or other processes, and be associated with specific factor configuration recommendations and either presented to the user for approval or automatically configured on the media device. Likewise, comments posted on video sharing mobile applications 460, like TikTok may also be analyzed to determine if they are associated with the same media asset and such comments may be analyzed using NLP algorithms, or other processes, and be associated with specific factor configuration recommendations and either presented to the user for approval or automatically configured on the media device.

Figure 5:
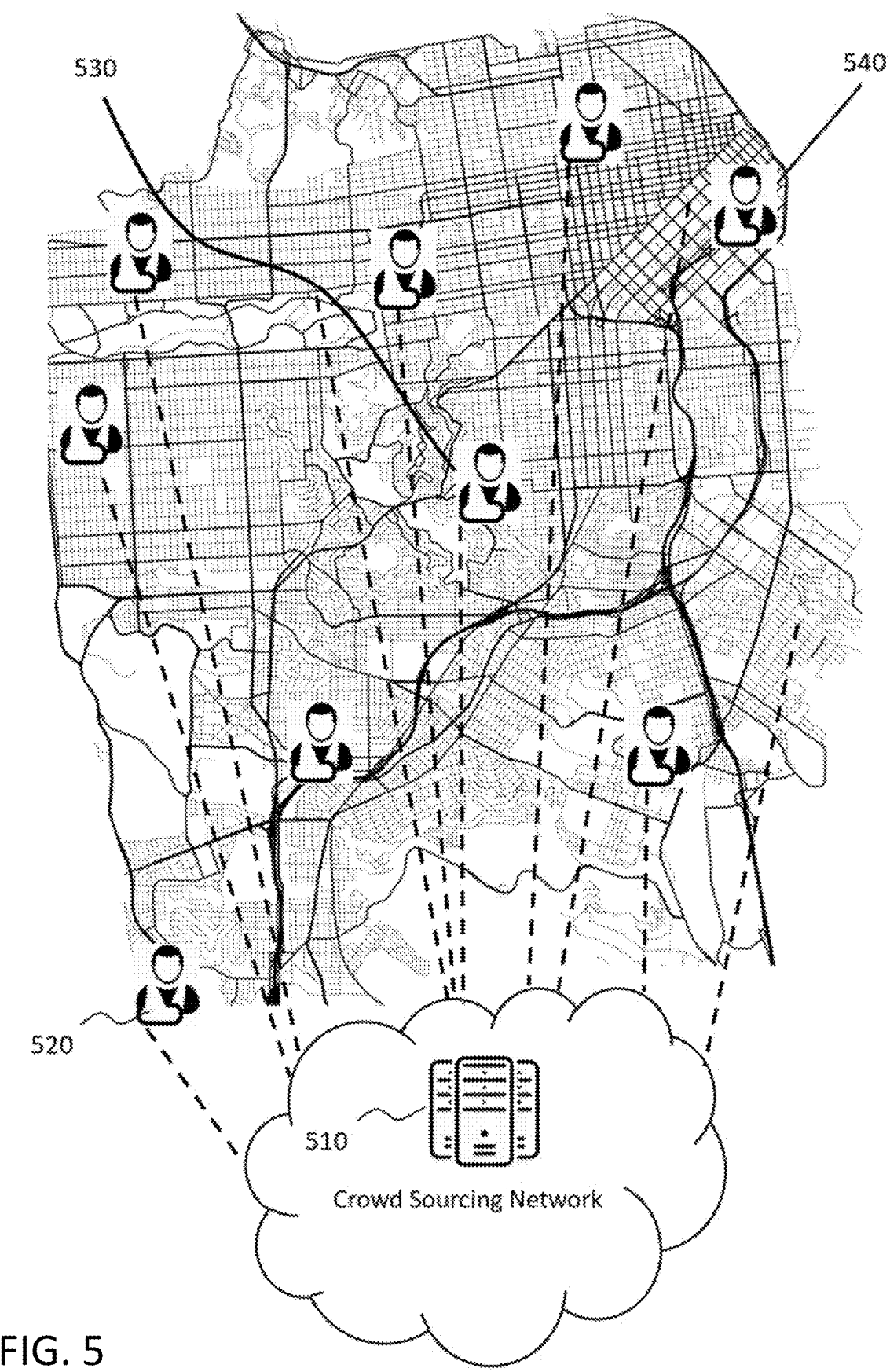
FIG. 5 depicts an exemplary crowd sourced network within a geographical region, in accordance with some embodiments.

In another embodiment, factor recommendations can be obtained through crowdsourcing 470 networks. FIG. 5 depicts an exemplary crowd sourced network within a geographical region, in accordance with some embodiments. The exemplary figure depicts the layout of the city of San Francisco. Although a specific city is displayed in the example, other locations and geographies are contemplated. As shown in the figure, several media asset consumers 520-540 are connected to the crowd sourced server 510. The media asset consumers may be spread across the city and sometimes even farther.

The crowd sourced server 510 collects data from each media asset consumer or consumer device (e.g., retrieve current settings of the consumer device). This include data relating to their likes, dislikes, comments, and any feedback provided by the media asset consumers in relation to the same media asset consumed as that which will be consumed by the current user. The crowd sourced server 510 may also obtain user behavior data relating to how they watched the media asset. For example, the crowd sourced server 510 may gather data on whether the viewers adjusted a factor while watching the media asset, at what time stamps were the adjustments made, were there any other factor configurations made by the viewers etc.

Although a city map is shown for explanatory purposes, the, crowd source network can be by state, country, or worldwide. For example, if a worldwide crowdsourced network is used, or a large crowd sourced network that spans across a country, multiple countries, a continent is used, then the crowd sourced server 510 may collect data from the viewers and parse the data based on the location of the user that will be consuming the media asset. In doing so, the crowd sourced server may determine whether comments made from another user that is far away in distance from the user who will be consuming the media asset are applicable due to the far away distance. For example, if the other viewer is far enough from the current user where a different language is spoken, then the other user's comments relating to captions, subtitles, or language of the media asset may not be as relevant to the user who speaks the same language as used in the media asset. As such, the comments are weighted based on the location of the user and other factors to determine if they should be applicable to the current user.

The crowd sourced server 510 may also use deep learning mechanisms to enhance the data for a specific factor. For example, the model may use as input, comments from various viewers that consumed the same media asset. The comments may be given different weights such that a recommendation to configure a factor is based on a weighted average.

Referring back to FIG. 4, in yet another embodiment, factor recommendations can be obtained by the system creating its own defined group 480. In this embodiment, a system may group the viewers who consumed the same media asset based on a variety of criteria such as age group, ethnicity, backgrounds, common interests. The system may also group viewers if they have liked similar media assets as the current user. Other criteria that determine a shared common characteristic between the current user the other viewers may also be used. In this embodiment, the system would obtain comments relating to media asset, analyze them by using NLP algorithms, and associate the comments with specific factor configuration recommendations and either presented to the user for approval or automatically configure on the media device.

Figure 6:
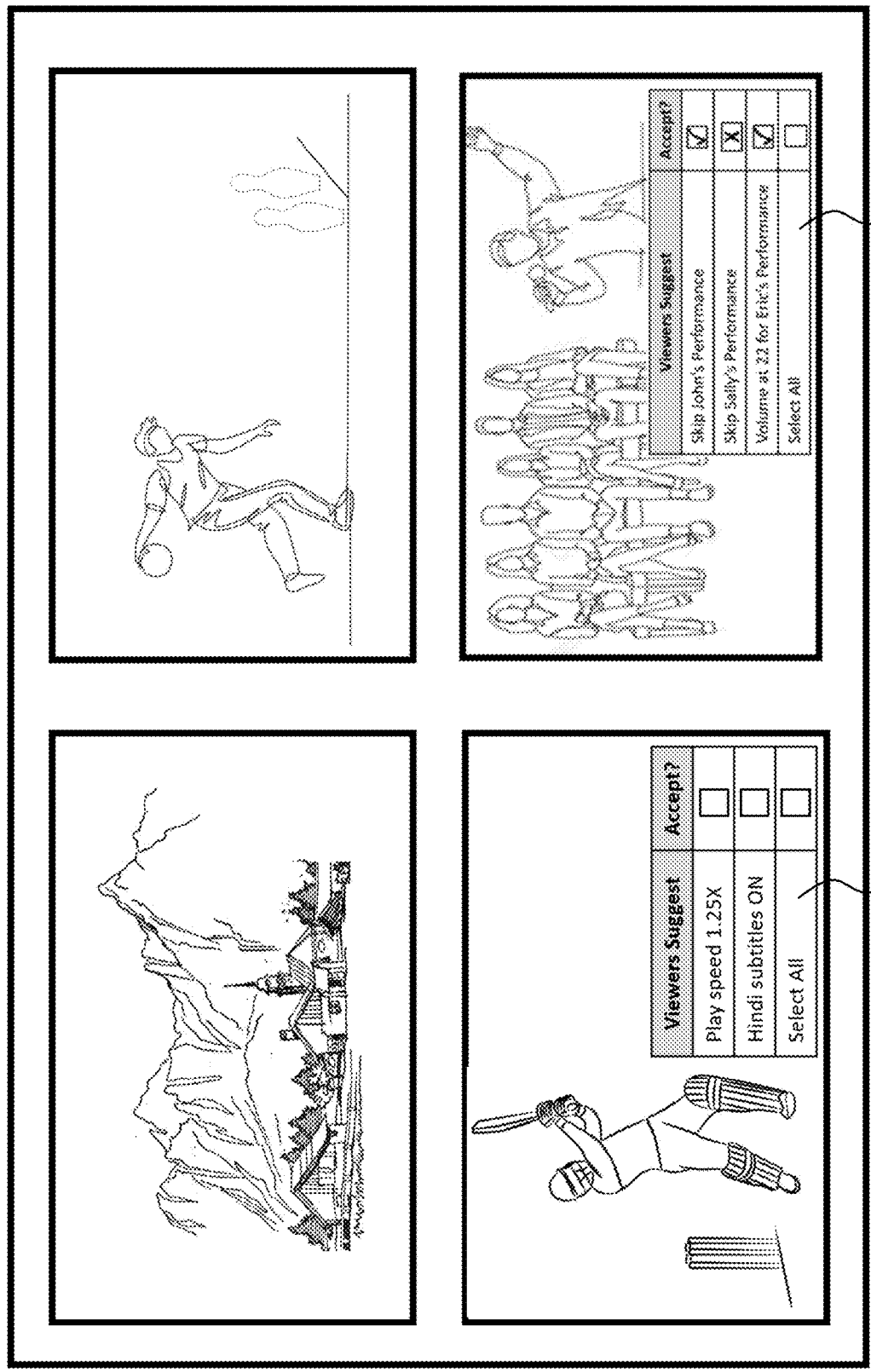
FIG. 6 is a block diagram of a survey displayed on a user interface, in accordance with some embodiments.

In another embodiment, the system may send out a survey as shown in FIG. 6 to the selected group. The individuals in the group may fill out the survey, approve/disapprove a recommendation of a factor that can be configured on the media device specifically for watching the same media asset. The survey results can be used by system to determine their views on the one or more factors. For example, as depicted in FIG. 6, the survey may be presented on a user interface that depicts a plurality of media assets. The system may produce a selectable template for the viewers to accept or deny one or more factor recommendations.

For example, the survey 610 may include an option to approve or reject a recommendation for factors for displaying a cricket game. For example, the factor recommendation may be for a cricket game. Since a cricket game may be played over a long duration of time, such as 5 hours or longer, some portions of the game are more exciting than others. When batsman hits a ball out of the park, known as a sixer, or if the bowler strikes out the batsman, may be more exciting to watch than lulls in the game where not much action takes place. In one embodiment, the system, using artificial intelligence (AI) algorithms, may detect lesser exciting periods in the game or other lulls or slow periods in the game and automatically generate a recommendation to speed up watching of the game to 1.25× speed until certain key game turning moments take place. In another embodiment, instead or generating its own recommendation based on AI, the system may source comments from other users that have consumed the cricket match by generating a survey to determine if a threshold number of viewers that watched the cricket game would recommend watching it at a faster speed. The system may also, in real-time, generate a survey and dynamically change the media device's configurations during the game based on comments received from other users.

As shown at block 610 of in FIG. 6, in this survey a viewer is being asked whether they recommend playing the cricket match at a play speed of 1.25× and whether they would recommend playing the commentary associated with the cricket match with Hindi subtitles ON. The viewers in the crowd sourced network to whom the survey is presented, or a user defined group, may approve, reject the recommendation or suggest another alternative to the factor recommendations. Their acceptance of both options shown would mean that they would recommend configuring the media device such that the factor relating to speed be set at 1.25× speed and have Hindi subtitles ON when consuming the cricket match for a better viewing experience. Once the selections are obtained from the viewers in the crowd sourced network, they may be analyzed using NLP algorithms, or other processes, and be associated with specific factor configuration recommendations and either presented to the user for approval or automatically configured on the media device.

The survey may be in the form of an inline display that is overlaid on top of the media asset selection, as shown in FIG. 6, or may be presented in other forms. For example, the survey questions may be display during the viewing of the media asset in a portion where it does not obstruct the view of the characters in the video frame. It may also be presented to the user after the user has exited the media asset. It may be presented at the end during the credits portion of the media asset. It may also be presented separately on the user's mobile device or another electronic device associated with the user if the user has opted to receive such surveys.

Referring back to FIG. 4, the crowd sourcing option 470 and separate group option 480 may be implemented by having a plurality of client devices associated with a plurality of viewers that have consumed the media asset in communication with an application server. Besides having consumed the same media asset, the users may have been placed in the group based on a common characteristic shared between them.

In operation, the sever may send and collect data from client devices and record the data such that it can be analyzed and presented to the user that is or will be consuming the same media asset. The client devices for the viewers in the crowd sourced network or the defined group may include graphical user interface (GUI) configured to receive factor recommendation related queries that include data objects, wherein the data objects include representations of each factor, or a subset of selected factors, that can be configured on a media device on which the media asset is to be consumed.

The system may also use application programing interfaces (APIs) to allow communication between client devices and sever for obtaining data related to factor recommendations. Using the APIs, the server may source for a recommendation from client device for a specific data object. The client device presented with a recommendation may approve or rejects the recommendation. If the client device approves the queried recommendation, then the data entered at the client device is received and analyzed. The data may then be analyzed using NLP algorithms, or other processes, and be associated with specific factor configuration recommendations and either presented to the user for approval or automatically configured on the media device.

Referring back to FIG. 3, the system queries the factors at block 350 if a determination is made at blocks 320 and 340 that comments related to a factor are not provided by the user or other users on the platform on which the media asset is being accessed. As such, as described above, the system explores other platforms and crowd sourcing options to survey and obtain such factor related comments that can be analyzed and converted to factor configuration recommendations for the user that will be consuming the media asset. If comments are not available from other platforms and crowd sourced networks, the system generates its own defined group to obtain such data.

In another embodiment, regardless of the determinations made at blocks 320 and 340, the system may query factors from other online sources, such as those described in FIG. 6, to determine which factors are popular. It may also determine which factors are trending in social media. Such automated queries made by the system ensure that any popular or trending factor which would enhance the viewing experience are not missed. Once the factors are discovered based on the query, they are presented to the user for approval. If approved, they are configured on the media device.

If a determination is made at block 340 that comments related to a factor are available on the platforms, such as from viewers who have consumed the same media asset, then at block 360 the system determines if the quantity of comments meet a threshold quantity. Since providing a factor configuration recommendation based on comments from a single viewer, or only a handful of viewers, that have consumed the media asset may not represent a majority opinion, the system generates a factor recommendation once a threshold quantity of comments that recommend the same factor configuration are obtained.

If at block 360, a determination is made that the threshold quantity is not met, then the system may query factors as described above in block 350. In one embodiment, the system may detect a comment for the media asset, or a comment for a specific factor of the media asset, made by a user, or a small group of users. Receiving or detecting the comment may trigger an automated process to perform queries based on the received comment to determine if other users on the same platform have also commented on the same media asset as a whole or on the specific factor of the media asset.

For example, as shown in FIG. 6, block 620 may be a media asset that relates to a singing competition. In one embodiment, a number of users that have consumed the media asset may have posted a comment to skip John and Sally's performance and watch Eric's performance at a higher volume. The system receiving the recommendations may automatically trigger a query mechanism to determine if other users on the same platform on which the media asset is provided also commented on the John, Sally, and Eric's performance. If a threshold number of people commented on John, Sally, and Eric's performance, then the system would analyze those comments to recommend a factor configuration based on their comments. However, if the number of comments for John's performance do not meet a threshold quantity, then the system would query for more comments relating to John as described above in block 350. Several combinations may be possible in this scenario, such as, the number of comments for John's performance may meet the threshold quantity however the number of comments for Sally's performance may not meet the threshold quantity. As such, for those factors that do not meet the threshold quantity, additional queries are made.

Block 620 is an example of a survey sent to an individual who has consumed the same media asset to determine their recommendation for John, Sally, and Eric's performance. As depicted, the individual accepted to skip John's performance, rejected to skip Sally's performance, and accepted that while watching Eric's performance the volume level should be raised to 22 for the best experience. As described earlier, the viewers may provide recommendations for the entire media asset, e.g., recommend watching at a higher brightness level for the entire duration of the media asset, or may provide recommendations for a segment of the media asset, e.g., skip John and Sally's performance and increase volume for Eric's performance.

If the number of comments that relate to a factor meet the threshold quantity at block 360, then factor configuration recommendations are made to the user that is consuming, or will be consuming, the same media asset. In one embodiment, at block 370, factor recommendations are provided to the user for approval. For example, the system may generate a user interface that will display the factor recommendation and allow the user to either approve or reject the recommended factor configuration. If the user approves the factor recommendation, then at block 330, the media device on which the media asset will be displayed is configured based on the factor recommendations, e.g., the media device's brightness is increased, volume is turned up, or captions are turned ON. All approvals and rejections by the user are stored at block 390. The stored approvals and rejections are fed into a machine learning algorithm such that a user behavior model can be generated. The model is trained over a period of time by adding data every time a factor selection is made and is used for predicting future factor recommendations.

In one embodiment, as described in block 370, the system may provide an option for the user to approve or reject the factory recommendation, and in another embodiment the system may automatically configure the media device. Automatically configuring may be performed if a factor that is being configured for display of the current media asset was also configured for another media asset that previously consumed by the same user. Additional details on configuring the media device, whether through user approval or automatically, are described further in FIG. 12. The system may also determine media device capabilities prior to making the factor recommendation. For example, if the media device does not support a particular factor, then a recommendation will not be made.

Figure 7:
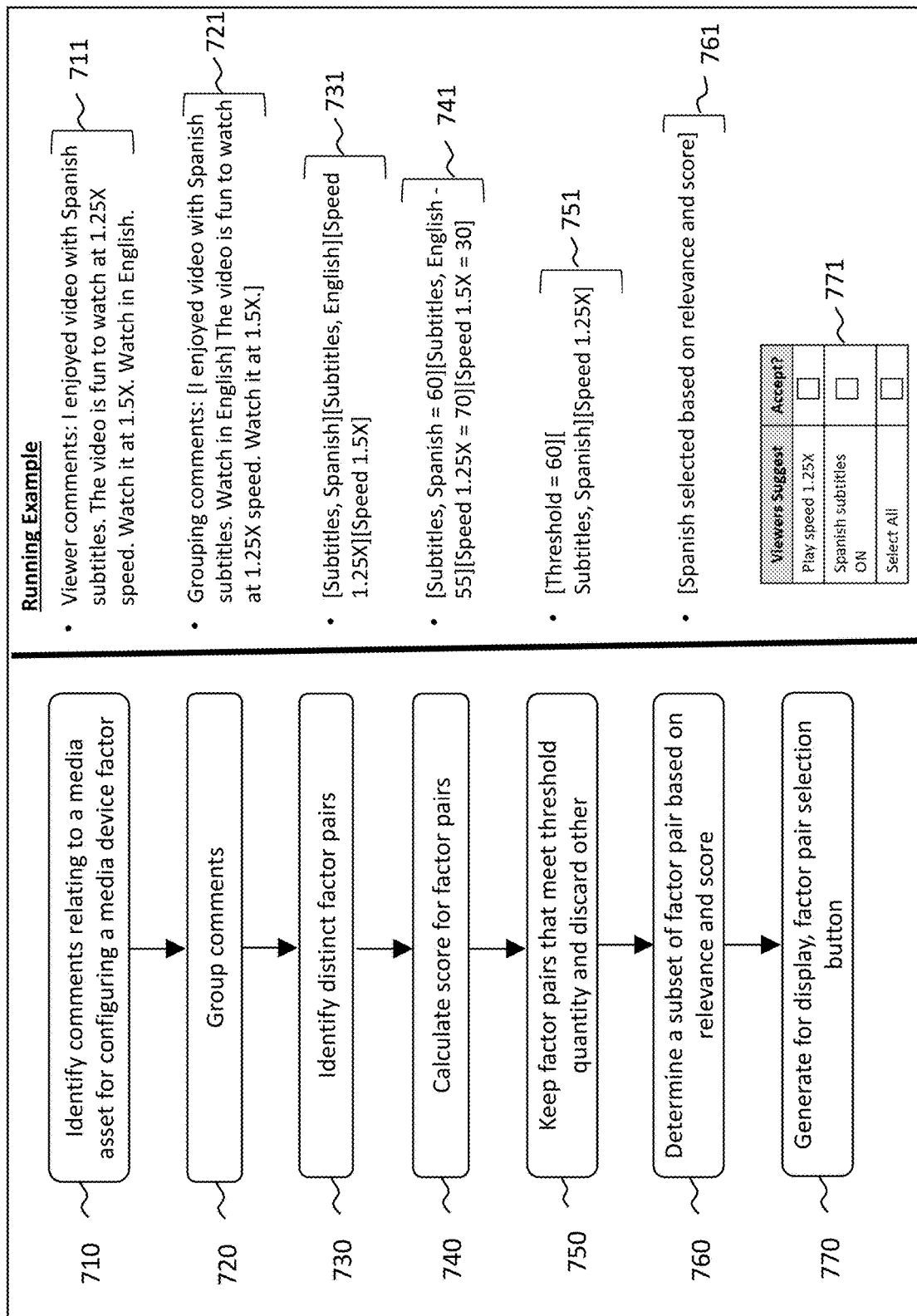
FIG. 7 depicts a flowchart of a process and a running example of the process to identify, recommend, and implement a consumption option, in accordance with some embodiments of the disclosure.

FIG. 7 depicts a flowchart of a process and a running example of the process to identify, recommend, and implement a consumption option/factor, in accordance with some embodiments of the disclosure. At block 710, the system identifies comments relating to a media asset or relating to a factor associated with the media asset. The comments are analyzed and used to determine a configuration or a setting of the media device.

As depicted in FIG. 7, at 711, one example of configuring a factor change includes changing the speed from a normal 1.0× speed to either 1.25× or 1.5× on the media device such that the user can watch the specific media asset at the recommended speed. In this example, the comments obtained include: 1) "I enjoyed the video in Spanish subtitles, 2) "The video is fun to watch at 1.25× speed", 3) Watch its at 1.5×" and 4) "Watch us in English." The comments are from different viewers that have consumed the same media asset. A single user may also have commented on multiple factors, such as a single user may have made a comment both on the speed and subtitles. In addition to the comments depicted, other examples of comments include changing the brightness, increasing or decreasing the volume, turning ON/OFF captions or parental controls, skipping a section, or any other factor that can be changed on the media device.

The system analyzes these comments and generated command language that is reflective of the comments. The command language, which are instructions to a media device, can be used for modifying a factor that is offered by the media device. The system also accesses the capabilities of the media device to determine all the factors offered by the media device. If a factor is not offered by a media device, then the factor is not recommended. For example, if the comments recommend watching the media asset in 4K and the media device is not having 4K resolution, then the factor recommendation is not made.

At block 720, comments are grouped together. As shown at 721, comments that relate to subtitles are placed in a first group and comments that relate to a viewing speed are placed in a second group. The system automatically groups all the comments based on their context, e.g., speed, language, brightness etc. Grouping allows the system to analyze each group to determine a factor relative to the group. The comments within the group are scored and weighted so make the factor recommendation.

At block 730, distinct pairs of comments are identified by the system. As depicted at 731, the distinct pairs include subtitles 1) Spanish, 2) English, and speeds 3) 1.25×, and 4) 1.5×.

Scores for each distinct pair are calculated at block 740. The calculation involves determining the quantity of users that made the same recommendation and compiling them to obtain a count for each distinct recommendation. For example, as depicted at 741, 60 viewers recommended watching the specific media asset with Spanish subtitles ON while 55 viewers recommended watching the media asset in English. As such score of 60 and 55 are associated with the recommendations, respectively. With regards to the speed, 70 viewers recommended watching the media asset at 1.25× speed while 30 viewers recommended watching the media asset at 1.5× speed.

At block 750, the system determines if the number of comments for the distinct pair meets a threshold quantity. In one embodiment, the threshold quantity is set at 60. The threshold is a predetermined quantity that can be defined by the user or the system. The threshold can be modified on an as needed basis. The threshold quantity is used to ensure that a majority opinion is captured and that the recommendation to configure a factor is not based on an outlier, such as a single user or a small set of users whose recommendation may not be applicable to the current user. As depicted at 751, the recommendation for subtitles in Spanish, which received 60 comments and has an assigned score of 60, met the threshold quantity of 60 while the recommendation for English subtitles, which received 55 comments, did not meet the threshold quantity of 60. Likewise, the recommendation for speed at 1.25× which received 70 comments, met the threshold value of 60, while the recommendation for speed at 1.5×, which received 30 comments, did not meet the threshold quantity of 60.

Although in this example only one of the recommendations that related to subtitles met the threshold value, in another embodiment, it is possible that multiple recommendations that relate to the same factor may have met the threshold value. For example, in one embodiment the recommendation for Spanish subtitles may have received 80 comments and the recommendation for English subtitles may have received 70 comments, thereby both English and Spanish subtitle recommendations meeting the threshold value. In such a situation, at block 760, the system determines a subset of factor pairs based on relevance and score. As depicted at 761, Spanish subtitles are selected based on relevance and score for both examples, i.e., first example in which Spanish received 60 comments and English received 55 comments, where only the number of comments that recommend Spanish met the threshold quantity, and the second example where Spanish received 80 comments and English received 70 comments, where both comments for Spanish and English met the threshold quantity.

In yet another embodiment, popular recommendations that meet the threshold value may be presented to the user for selection. In this embodiment, a system may automatically create configuration profiles or viewing recommendations for popular content. For example, a media asset platform, such as HBO may offer for consumption Game of Thrones, a fantasy drama television series, for consumption. (Game of Thrones and HBO are trademarks owned by Home Box Office, Inc.) If the system determines that the series has gained popularity, which can be determined based on the number of users viewing the series that meet a certain threshold number, then the system may direct a server to automatically determine viewing recommendations based on the most popular viewing factors that were reported for the content (i.e., how most viewers consumed the content). Configuration profiles based on the popular viewing factors may be created and stored by the server. In one embodiment, the server may collect the popular viewing factors from comments posted by viewers that have consumed the Game of Thrones series. In another embodiment, the source of this viewing factors data could come any other source, such as media devices that were used to consume the series may automatically report viewing factors to the server. In one embodiment, viewing factors associated with such popular media assets may be presented to the user for selection. In another embodiment, the system may make available an identifier, such as a link, for viewing factors related to popular media assets, which when selected by the viewers, will display a plurality of popular viewing factor recommendations. The user may then select one or more popular viewing recommendations that can be used to configure the media device.

At block 770, the system generates for display the factor pair selection menu, checkboxes, or buttons. The system may generate a user interface on which such selection button may be displayed such that the user can approve or reject the factor pair recommendation. As depicted at 771, the system generated an option to playback of the media asset at a speed of 1.25×, and to playback the media asset with Spanish subtitles ON. A option "Select All" may also be displayed where the user can select all the recommendations at one time. The user may accept the recommendations by selecting the associated selection button. Although an exemplary factor pair selection is shown at 771, other alternatives, such as thumbs up or thumbs down, are also contemplated in the embodiments.

In this embodiment, if the user accepts the recommendation for playing the media asset at 1.25× speed and turning ON the Spanish subtitles, then the system automatically configures the media device such that when the media asset is consumed it is displayed at 1.25× speed with Spanish subtitles ON. In another embodiment, if the system determines that the media asset is related to another media asset previously consumed by the user, such as the current media asset is an episode of a series and the previously consumed media asset was another episode in the same series, or a movie which is part of a sequel, which the user has previously consumed, then the system may automatically configure the factors without providing the user a selection option.

Figure 8:
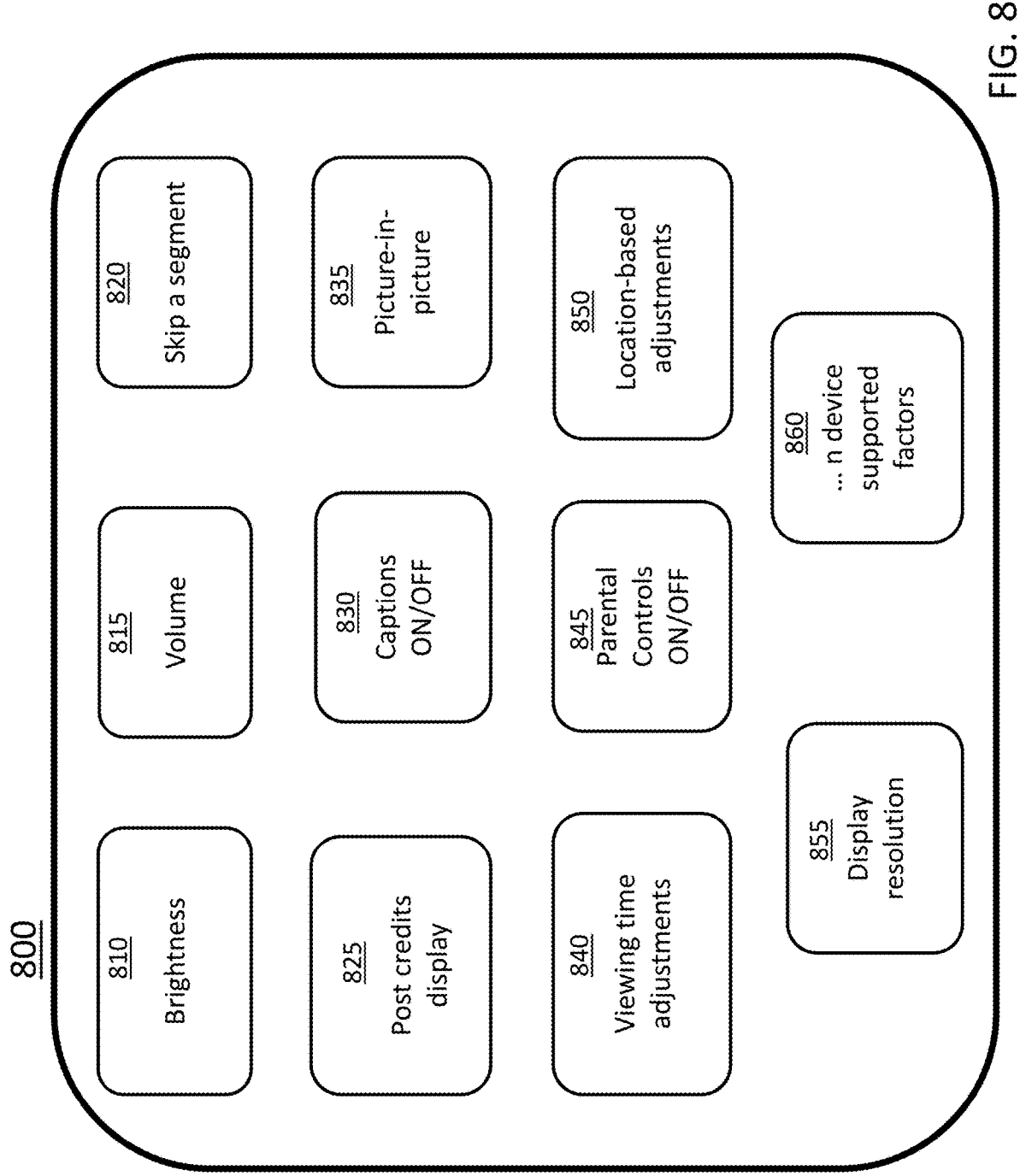
FIG. 8 is a block diagram of a plurality of exemplary factors/consumption options that can be configured on the media device for playback of a media asset, in accordance with some embodiments.

FIG. 8 is a block diagram of a plurality of exemplary factors/consumption options that can be configured on the media device for playback of a media asset, in accordance with some embodiments. Block 810 depicts an exemplary consumption option/factor, which is brightness, that can be configured on the media device that is used for consuming the media asset. A viewer that has consumed the media asset may have recommended that the media asset be watched at a specific brightness level. For example, if the media asset has darker backgrounds and watching it in brighter environment enhances the viewing experience then the viewer may have suggested a specific brightness level while watching. In another embodiment, the system, using artificial intelligence (AI) and other image/video analysis software, may have determined on its own that either the media asset as a whole, or some segments of the media asset, would be better viewed at a higher brightness level. In such an instance, the system would generate a query to users, such as in FIG. 6, who have consumed the media asset to get their opinion on whether they would also recommend watching at a higher brightness level. The system would also determine the brightness capabilities of the media device prior to querying the viewers such that only those brightness recommendations that can be accommodated by the media device are presented in the query to the viewers.

Block 815 depicts another exemplary factor, which is volume, that can be configured on the media device that is used for consuming the media asset. A viewer that has consumed the media asset may have recommended that the media asset be watched at a particular volume. The viewer may have recommended either watching the entire media asset at the recommended volume or specific segments of the media asset at the recommended volume. The system may also make its own volume recommendations and query viewers who have consumed the same media asset to get their opinion if they agree with the system generated recommendation.

In another embodiment, the system may also monitor user behavior to determine if a particular factor, such as a volume recommendation, should be implemented. For example, if the recommendation is to watch the media asset at a higher volume, however the system determines that at night the user usually lowers the volume between a certain time frame, then the system may override the recommendation and not configure the media device to playback the media asset at the higher volume. For example, the user may watch all media assets at a lower volume after 10 PM at night such that the household members are not disturbed. As such the same media asset watched at different times may have different factor implementations, for any factor, depending on user behavior.

Block 820 depicts another exemplary factor, which is skip a segment of the media asset, that can be configured on the media device that is used for consuming the media asset. A viewer that has consumed the media asset may have recommended to skip a segment of the media asset. As described above at block 820 of FIG. 8, if users that have consumed the singing competition media asset recommend skipping John's performance, and the number of users that recommend skipping John's performance meets the threshold quantity, then the media device will be configured such that when the segment of John's performance is played back, the media asset skips to the next segment. In another embodiment, the system may also automatically determines based on user behavior that the user usually does not like to watch certain segments, such as credits, and as such the system may either make a recommendation to skip the credits or automatically skip the credits and move to the next segment of the media asset.

Block 825 depicts another exemplary factor, which is to display the portion of the media asset after credits are displayed, that can be configured on the media device that is used for consuming the media asset. For example, in some media assets there may be content displayed after the credits are posted, such as a song, or some information that provides insight into the next episode or sequel. As such, viewers that have viewed the media asset may recommend that content displayed after credits are posted should be watched. If a user usually exits the media asset at the point when credits are displayed, in this scenario, having seen the recommendation that there is content after the credits, may accept the recommendation thereby allowing the system to automatically to skip credits and display the content after the credits.

Block 830 depicts another exemplary factor, which is captions, that can be configured on the media device that is used for consuming the media asset. A viewer that has consumed the media asset may have recommended that the media asset be watched by turning ON captions for the media asset. As such, the caption recommendation may be displayed to the viewer. Upon viewer approval of the caption recommendation, the media device is configured to turn ON captions. The system may also automatically turn ON captions if the user mutes the volume or lower is below a certain level.

Block 835 depicts another exemplary factor, which is picture-in-picture, that can be configured on the media device that is used for consuming the media asset. For example, another user that is interested in their home NBA basketball team, "The Warriors," may recommend watching the game when its game time. (The Warriors is a trademark owned by the Golden State Warriors, LLC).

The recommendation by another user may also be posted at any time, including posting to the online platform live while the other user is consuming the media asset. For example, if the other user is watching media asset and at some point, during the media asset the Warriors game is on live broadcast, then the other user may make a recommendation to watch the media asset as well as the Warriors game in a picture-in-picture display where the NBA game is displayed in a smaller window while the media asset is being watched. If the system determines that the number of users who are also fans of the same team recommend watching the game in a picture-in-picture format, and the number of users meets the threshold quantity, then such recommendation may be dynamically and in real-time displayed to the user who is or will be consuming the media asset during game time.

The user who will be consuming the media asset may also note in their own user profile that picture-in-picture be activated when the Warriors NBA game is ON. The system may also determine based on user behavior if the user likes to watch Warriors games prior to making such a recommendation. Machine learning models may also be used to determine user behavior and consumption patterns and used to activate certain consumption options automatically, e.g., if the user has previously activated picture-in-picture when the Warriors game was live, the system may automatically activate the picture-in-picture consumption option when it detects that live broadcast of the game is available for consumption. As such, the system may parallelly track other events of interest and activate the picture-in-picture feature based on user interests.

Block 840 depicts another exemplary factor, which is viewing time adjustments, that can be configured on the media device that is used for consuming the media asset. A viewer that has consumed the media asset may have recommended a factor configuration that is time-based, i.e., recommended at certain times of the day and not recommended at other times of the day. For example, viewers may recommend changing the brightness to a higher level at night and keeping it at a standard level during daytime. They may also recommend raising the volume to a higher level at night and keeping it at a lower level during the daytime. The system may also automatically determine based on user behavior if a certain factor recommendation should be turned ON during certain times of the day and not turned ON during other times of the day.

Block 845 depicts another exemplary factor, which is parental controls, that can be configured on the media device that is used for consuming the media asset. A viewer that has consumed the media asset may have recommended that the media asset be watched with parental control turned ON. If the number of viewers that make the same recommendation meat the quantity threshold, then the parental control recommendation is presented to the viewer for approval or automatically configured on the media device.

Block 850 depicts another exemplary factor, which is location-based adjustments controls, that can be configured on the media device that is used for consuming the media asset. A viewer that has consumed the media asset may make comments on configuring a factor when the media asset is watched. However, the system may not present the recommendation to the current user because the current user is located in a geographical location that is far away from those that made the recommendation to configure the factor. For example if a media asset which has Spanish language was commented upon by an English speaking user in United Kingdom, where English is the primary language, however the current user who is or will be consuming the same media device is located in Spain, where the primary language is Spanish, then a recommendation by the United Kingdom English speaking viewer to turn ON subtitles such that they can consume the media asset in English is not applicable to the viewer in Spain who already understands the Spanish language used in the media asset.

Block 855 depicts another exemplary factor, which is display resolution, that can be configured on the media device that is used for consuming the media asset. A viewer that has consumed the media asset may recommend that the media asset be watched at a higher resolution, such as 1080P, 4K or 8K. Once such a recommendation is made, the system may determine whether the media device on which the media asset is to be played has capability to playback the media asset at the recommended resolution. If the system determines that the media device does not have such capability, then the recommendation is not made. In another embodiment the system may be provided access to all electronic devices owned by the viewer who will be consuming the media asset. The system may query each electronic device and store its capabilities such that a factor recommendation can be made only if the device includes the capabilities to handle such a recommendation.

Although a few exemplary factors have been discussed in FIG. 8, as depicted in block 860, the system can handle any factor adjustment that is supported by the media device. As mentioned earlier, in one embodiment, once a factor is selected, such as one of the factors from FIG. 8, the system transmits a selectable menu or button to the user to either approve or reject the recommendation for configuring the media device such that once configured the factor is applied to display the media asset. For example, FIG. 9 depicts a configuration option recommendation provided to the user who will be consuming the media asset. As depicted, the system generated selectable recommendation includes brightness level, volume, skipping credits, and watching the media asset on a 4K resolution.

In one embodiment, as depicted the user has approved the recommendation for configuring the media asset such that the brightness level is set at level 7. In this embodiment if the current brightness level is higher or lower than level 7, then the configuration would automatically set the brightness level to 7.

In another embodiment system has recommended that the volume level be set at 18. As depicted, the user who will be watching the media asset has rejected the recommendation. As such, the system will not configure the media asset to volume level 18 and leave it at the current volume level.

In another embodiment system has recommended that the media asset be configured such that the credits of the media asset are skipped. As depicted, the user who will be watching the media asset has rejected the recommendation. As such, the system will not skip the credits and play them during the playback of the media asset.

In yet one embodiment, system has recommended that the media asset be configured such that the media asset be consumed on a media device that has 4K resolution. As depicted the user has approved the recommendation.

In one embodiment the system has access to all the media devices that are associated with the user. As such the system may query each media device ahead of time and gather their capabilities. In one embodiment, prior to making a recommendation, the system may determine if the media device is capable of providing the recommended consumption option. If it is not, then the system will not make the recommendation. Since the system is aware of all the devices associated with the user, if one of the devices does not have the capability to incorporate the recommendation, the system may suggest another device that is associated with the user that does have that capability to be used instead.

Referring back to FIG. 8, the consumption options may have been received by the system through comments posted by other users who have consumed the media asset, the preferences stored by the user in the profile, and behavior patterns detected based on user consumption history. These comments may be analyzed by natural language processing (NLP) systems to associate them with recommendations and instructions for configuring the media device. In one embodiment, the recommendations, which are converted to instructions for the media device, may be 1) segment-based, 1) time-based, or 2) location-based.

Figure 10:
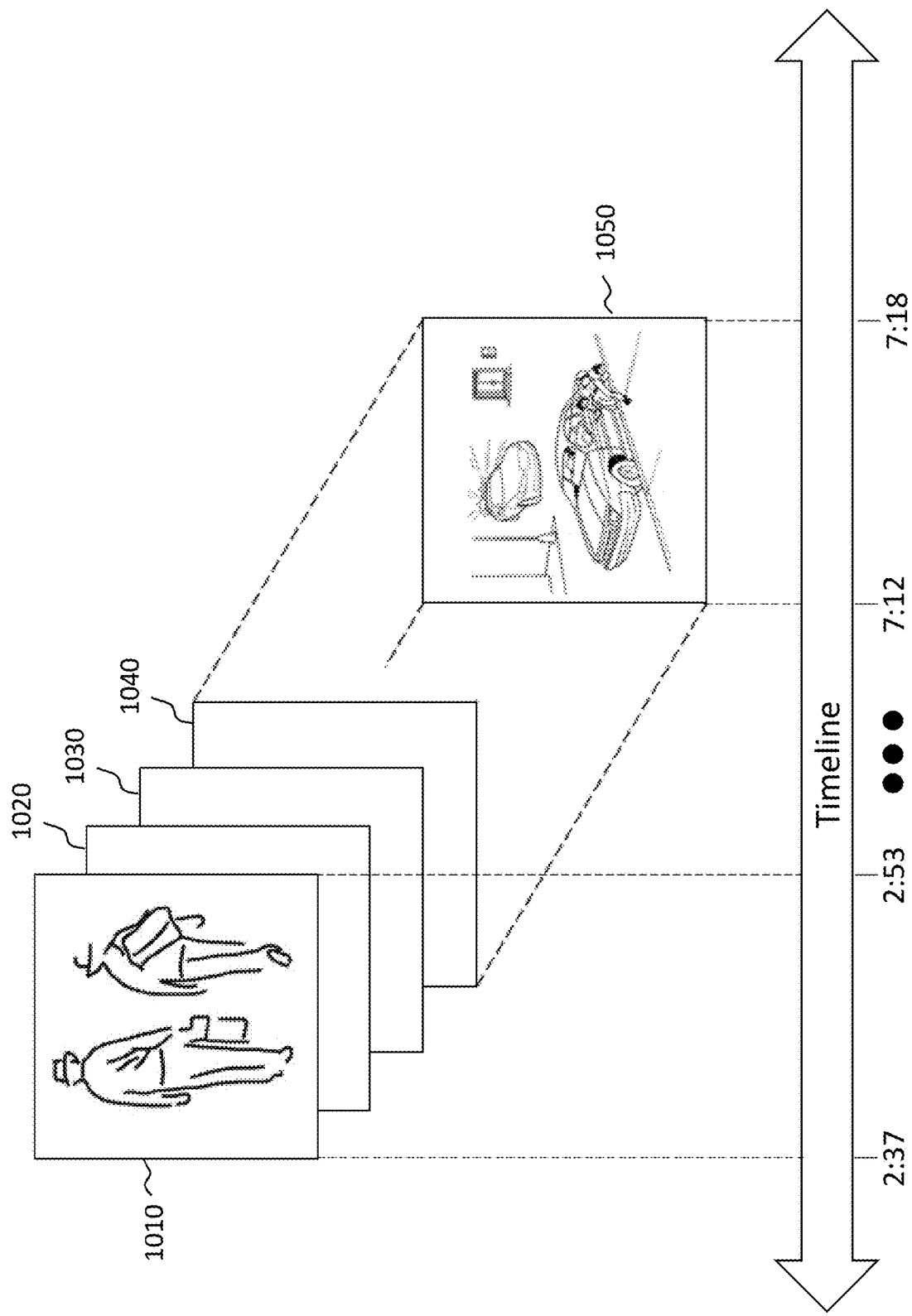
FIG. 10 depicts a block diagram of a plurality of segments of a media asset, in accordance with some embodiments of the disclosure.

With respect to segment-based recommendations, in one embodiment, the recommendations for configuring a consumption option, also referred to herein as factor, can be for the entire duration of the media asset or for a specific segment of the media asset. For example, FIG. 10 depicts a block diagram of a plurality of segments of a media asset, in accordance with some embodiments of the disclosure. The media asset may contain several segments and for exemplary purposes only segments 1010-1050 are depicted. In one embodiment, segment 1010 shows two individuals that are walking and having a discussion. In this embodiment they are speaking to each other in a low or average voice which is roughly between 50-60 decibels. This segment is displayed between the start time of 2:37 and end time of 2:53. Other segments of the media asset 1020-1040 follow the segment 1010 in the timeline until the media asset reaches playback segment 1050. In one embodiment, segment 1050 involves a car chase with loud police car sirens and gunshots as the police is chasing a bank robber. The volume of the car chase, police sirens, and the gun shots in this segment reaches decibel levels 160-180. This segment is played back between 7:12-7:18 after which the police catch the bank robber and the volume in a subsequent segment goes back down to between 50-60 decibels. Likewise, in a series having a plurality of episodes, the recommendations may be specific even within a segment, such as from 17:14:18:10 the volume is raised to level 18.

In one embodiment, users that have consumed this media asset may have recommended to lower the volume for segment 1050 between the times of 7:12-7:18 due to its loud sounds. The system processes these comments, for example by using the process described in FIG. 3, and if the number of comments meet the threshold value, then the system may provide a recommendation to the current user on a user interface for selection. A recommendation such as that depicted in FIG. 9 may be depicted on the user interface. The recommendation may suggest lowering the volume during the segment 1050 to a certain volume level. The consumption option recommendation may be implemented on the user device for consuming the media asset upon receiving an approval from the user.

In another embodiment if the user has already provided a preference in their user profile to lower all high-volume segments to a certain volume level, then the system may automatically lower the volume during segment 1050.

In yet another embodiment, a machine learning model may detect based on prior consumption history that the user usually lowers the volume during high volume segments. Based on detecting such a pattern, the machine learning model may automatically populate the user's profile with a preference to lower the volume during high volume segments. The machine learning model may be trained overtime for any factor discussed herein. For example, the machine learning model may be trained overtime based on number of occurrences where the user lowers the volume during high volume segments. A predetermined threshold may be set either by the user or the system where if the user activates a consumption option a threshold number of times, then a pattern is established. For example, the threshold value may be set at 3, 5, or some of number of times the user activates the consumption option, such as the user has lowered the volume 3 times previously when watching a high-volume segment. A threshold value for different factors may also be set by the system based on average, maximum, and minimum recommendations provided by other users, media devices, and systems.

In yet another embodiment, the recommendations, and the instructions to the media device that are generated based on the recommendations, are time-based. In this embodiment the system would determine if a recommendation for consumption option applies to a specific time when the user is consuming the media asset. For example, the recommendations may or may not apply depending on whether the user is consuming the media asset in the morning, afternoon, night or late night or during a certain hour. These may vary on a case-by-case basis and are personalized to the user's environment. For example, a user that has a baby or another individual in a household that sleeps during a certain time frame during which the user prefers to keep the volume low, then a recommendation to increase the volume may be applied if the user is consuming the media asset during daytime and not be applied if the user is consuming the media asset during night hours when others in their household are sleeping. Such user preferences may be stored in the user profile or determined by the machine learning model based on user consumption patterns.

Likewise, recommendation for increasing brightness or increasing contrast may or may not apply depending on the time of day that the user consumes the media asset and the brightness around the media device. Using picture-in-picture is yet another example where the consumption option may be activated only during certain time of the day when another broadcast of interest to the user is being displayed live such that the user can watch bought the media asset and the broadcast in a picture in picture format.

In yet another embodiment, the recommendations, and the instructions to the media device that are generated based on the recommendations, are location-based. In this embodiment, the system would determine if the recommendations made are location based. This may be determined based on the user comments, user profile, or a pattern detected by the machine learning model. For example, the users making the recommendations for the consumption option may comment that the consumption option be activated for users that are in a particular country. The system may also determine that the recommendations made are from users that are in a different geographical area and may not apply to the current user.

As mentioned above, the recommendations may be specific, e.g., 1) segment-based, 2) time-based, or 2) location-based, or may apply to the entire media asset. Although a few exemplary specific recommendation types have been discussed above, other specific recommendations types are also contemplated. For example, yet another specific recommendation type may be a further variation of the segment-based recommendation. For example, in a situation where all the episodes in a series have the same viewing recommendations, or in some cases, different viewing recommendation, such as in a specific segment, plot, or scene, then a sub-recommendation within the main recommendation may be created and stored. The sub-recommendation may relate to specific time frames within a segment when a recommendation is to be applied, e.g., between 17:10 and 18:14.

These recommendations are obtained from user profile, user consumption patterns, and comments posted by the platform on which the media asset is provided as well as at other online platforms, such as those depicted in FIG. 4, that provide the media asset for consumption. In one embodiment, the system may be configured to automatically monitor one or more sources from which comments and preferences can be obtained such that once a comment is posted, or a user profile is updated, the system automatically receives the comment or update, analyzes the consumption option/factor, and follows the processes discussed herein to determine whether to configure the media asset with the consumption option. System may configure application programming interface (APIs) to enable such monitoring.

Figure 11:
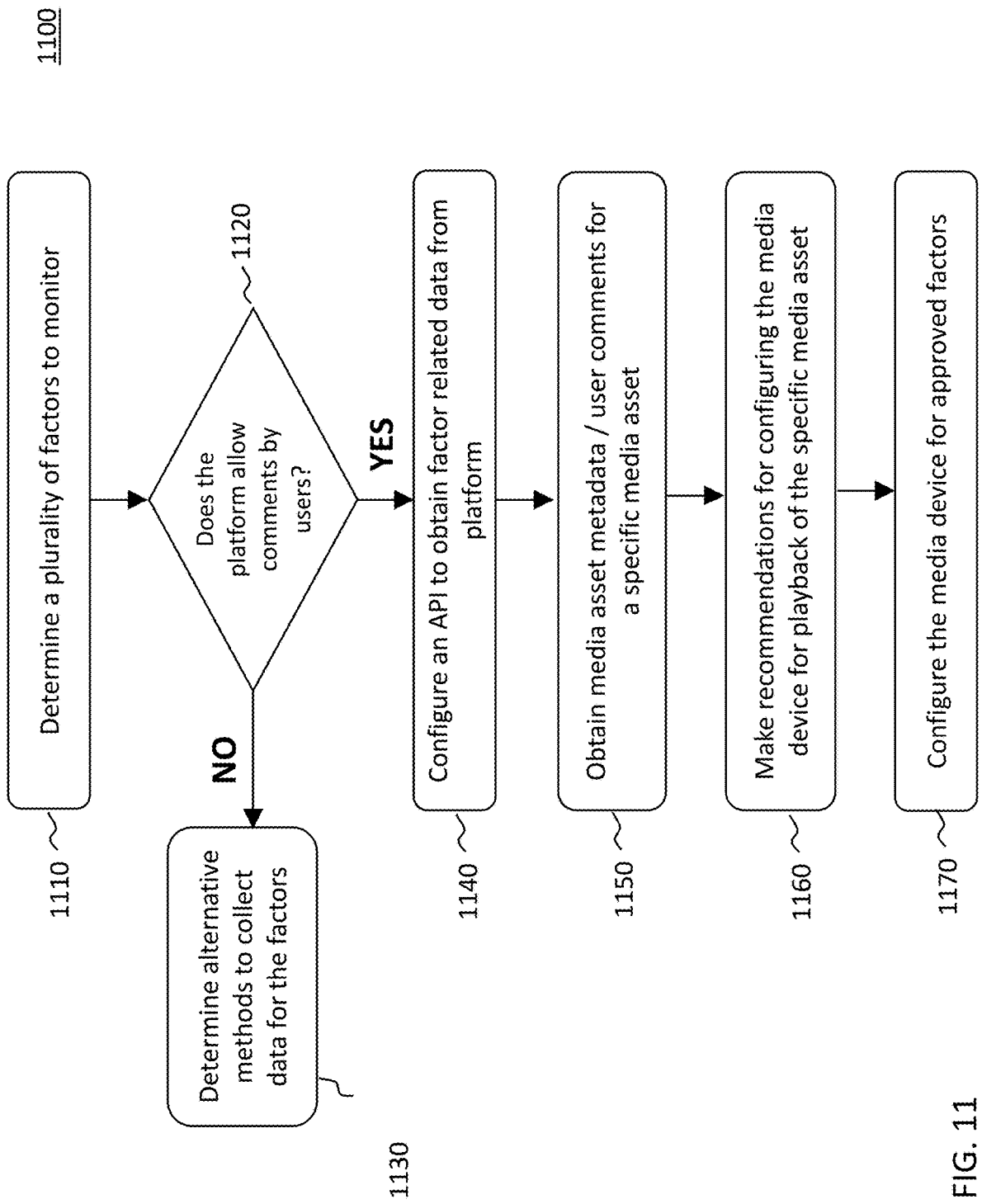
FIG. 11 is flowchart of a process for monitoring sources from which comments relating to a consumption option/factor may be obtained, in accordance with some embodiments of the disclosure.

FIG. 11 is flowchart of a process for monitoring sources from which comments relating to a consumption option/factor may be obtained, in accordance with some embodiments of the disclosure.

At block 1110, the system determines one or more factors to be monitored. When comments related to the factor are not available on the platform through which the media asset will be accessed and consumed, or comments are available but the number of comments available do not meet the threshold value, the system may decide to monitor the factor from current platform and other platforms that provide the same media asset to obtain comments when they are posted.

At block 1120, the system would determine if a platform that offers the media asset allows its users to post comments relating to the media asset or a factor for displaying the media asset. Since some platform may not allow comments from users, if a determination is made that the platform does not allow posting of comments, then at block 1130 the system determines alternative methods to collect the data for the factor. These methods include searching for other platforms that support comments, crowd sourcing comments, of creating a defined user group as described in FIGS. 4 and 5.

If a determination is made that the platform allows posting of comments, then at block 1140, the system configures an application programming interface (API) such that it can communicate and monitor the platform on a periodic basis.

At block 1150, when a comment related to a factor for displaying the media asset is posted on the platform that is being monitored, or metadata of the media asset is updated to include a factor recommendation, then the system obtains the metadata and/or the user comments such that they can be analyzed further.

At block 1160, based on the analysis of obtained comments, the system may make a recommendation for configuring the media device that is to be applied during playback of the media asset.

At block 1170, the media device is configured with the recommendation. As described in FIG. 12, the configuration may be performed automatically or after user approval. The system may also determine if the consumption option/factor recommended is supported by the media device prior to automatically or upon approval configuring the media device with the factor.

Figure 12:
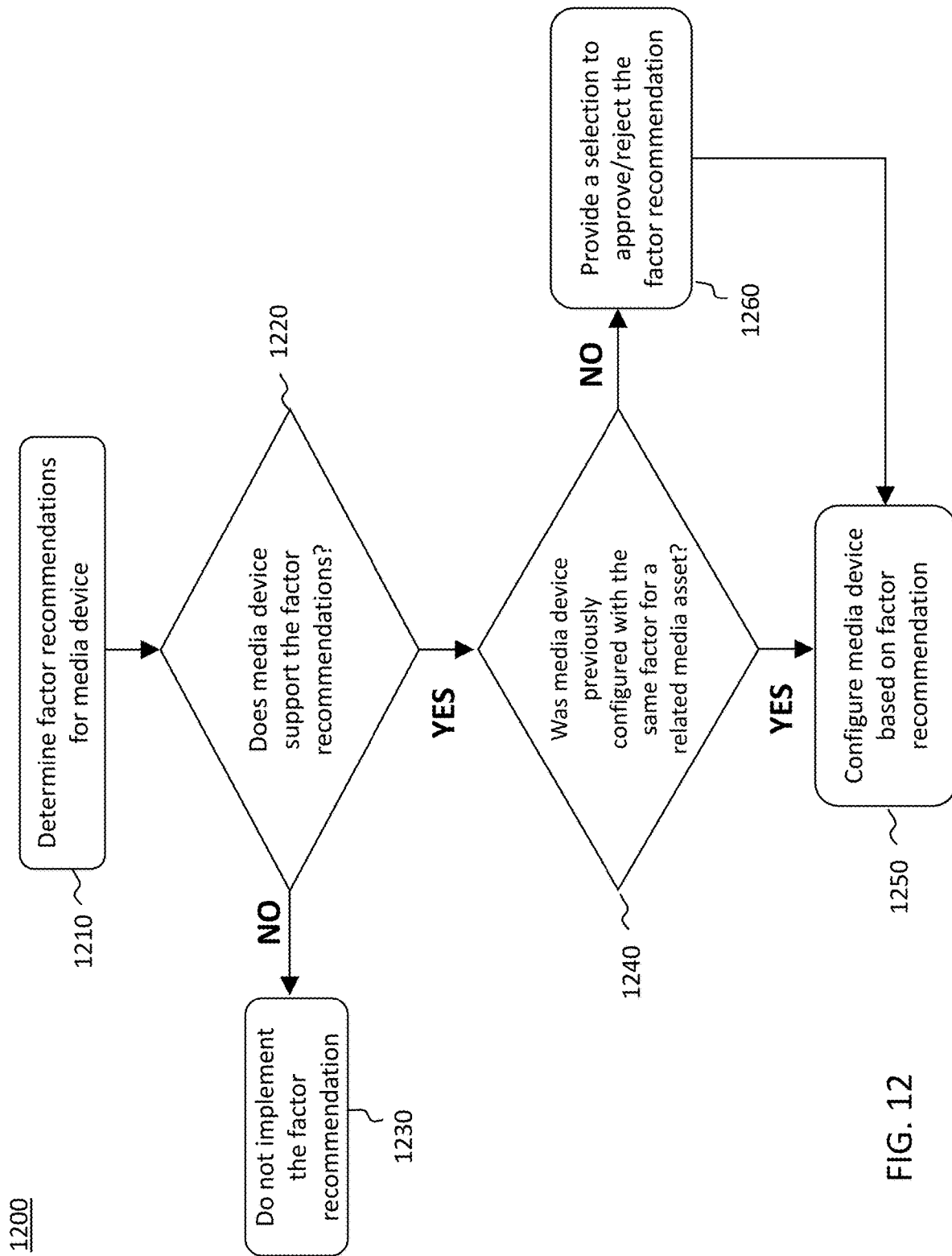
FIG. 12 is a flowchart of a process for determining if the consumption options are supported by the media device, and if so, the process provides methods for configuring the media device with the consumption option, in accordance with some embodiments of the disclosure.

As depicted, in FIG. 12 is an exemplary process for determining whether the device supports the consumption and how to implement the consumption option, i.e., automatically or based on user approval, in accordance with some embodiments.

The process 1200 begins at block 1210. In one embodiment, the user authorizes the system to access all its media devices. The system queries the media devices to determine the consumption options/factors supported by each of the media devices associated with the user. The system may store the factors of each media device in a database. The system may also periodically check for new media devices associated with the user. For example, the system may monitor a home router to determine if a new media device has been onboarded to the home network and determine the factors supported by the new device.

At block 1220, the system may compare a factor recommendation with the factors supported by each device that are stored in the database. If the system determines that the media device does not support the recommended factor, then at block 1230, the factor is not recommended for configuration and the media device is not configured with the factor.

If the system determines that the media device supports the recommended factor, then at block 1240, the system determines whether the same factor was previously configured for a related media asset. In one embodiment, a related media asset includes an episode of a series or a sequel/prequel to a movie, or a media asset that shares similar characteristics to another media asset, such as part of an education series, or a media asset that is contextually related to another media asset.

If the system determines at block 1240 that a factor that is being recommended to be configured for the current media asset has been previously configured on a related media asset, such as it was configured on the 1st episode off a series and the user is currently watching a subsequent episode of the same series, then the system at block 1250 may automatically configure the media device with the factor recommendation.

However, if the system determines at block 1240 that a factor that is being recommended to be configured on the media device to be applied during playback of the current media asset has not been previously configured on a related media asset, then, instead of being configured on the media device automatically, the system, at block 1260, may provide a selection for the user to approve or reject the factor recommendation. If an approval is received, then at block 1250 the media device is configured with the factor recommendation, however, if a rejection is received then the media device is not configured with the factor recommendation.

FIGS. 13-16 describe some embodiments which identify a user that is consuming the media asset and based on the identification provide a personalized configuration of the media device based on consumption options that are preferred or suitable for the user who is consuming the media asset.

Figure 13:
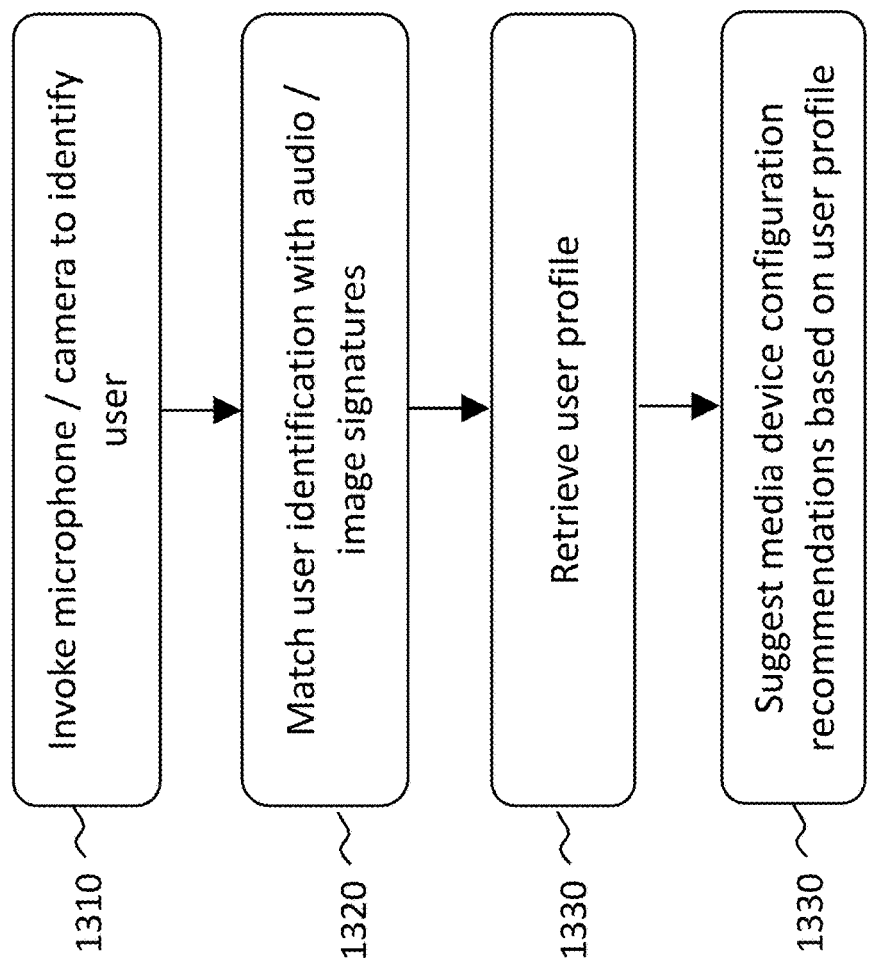
FIG. 13 is a flowchart of a process for identifying a user who is consuming the media asset, in accordance with some embodiments of the disclosure.

FIG. 13 is a flowchart of a process for identifying a user who is consuming the media asset, in accordance with some embodiments of the disclosure. Process 1300 invokes a microphone and/or a camera associated with the media device on which the media asset is to be displayed. The system may allow the media device to continuously listen or monitor a defined area or alternatively turn on the microphone or camera of the media device when it detects a user within a predetermined distance from the media device, such as detecting an individual sitting on a sofa that is within the line of sight of the media device.

At block 1320, the system may analyze a speech uttered by a user who is within the predetermined distance from the media device. The system may store an audio signature of all potential users, such as members of a household, in a database. Each audio signature may identify a particular user associated with the media device. When an uttered speech is detected, the system may determine a match between the uttered speech and an audio signature saved in the database. Based on the determination of a match, the system identifies which user is likely to consume the media asset.

In another embodiment, the system may determine a match based on image analysis. In this embodiment, the system may invoke a camera of the media device when it detects movement within a predefined distance of the media device. The media device may include motion sensors that detect movement. Alternatively, it may invoke the camera anytime a media asset is being consumed.

Using the camera of the media device, the system may capture an image of the user. The system may also store facial profiles of all users associated with the media device. The system may use facial recognition techniques to process the captured image and then match it with a stored image of users associated with the media device. The system may identify the user who is within the predetermined distance and likely to consume the media asset based on a match between the captured image and an image stored in the database that is associated with a particular user.

At block 1330, based on the identification of the user, the system may retrieve the user profile for the identified user and determine if the user has identified any preferences in their user profile for consumption options. The system may also look at comments and recommendations posted by other users and determine if they apply to the user who has been identified.

At block 1340, the system may suggest media device configurations based on the user's profile. The system may also automatically configure the media device if the user profile indicates a preference for the suggested configuration recommendation.

Figure 14B:
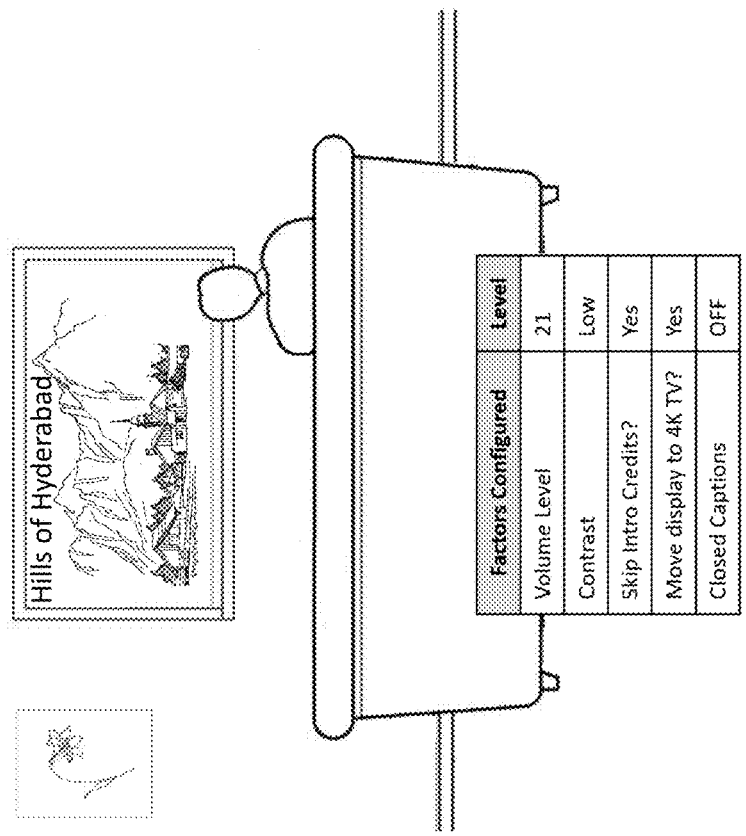
FIG. 14B depicts a second individual consuming a media asset, in accordance with some embodiments of the disclosure.
Figure 14A:
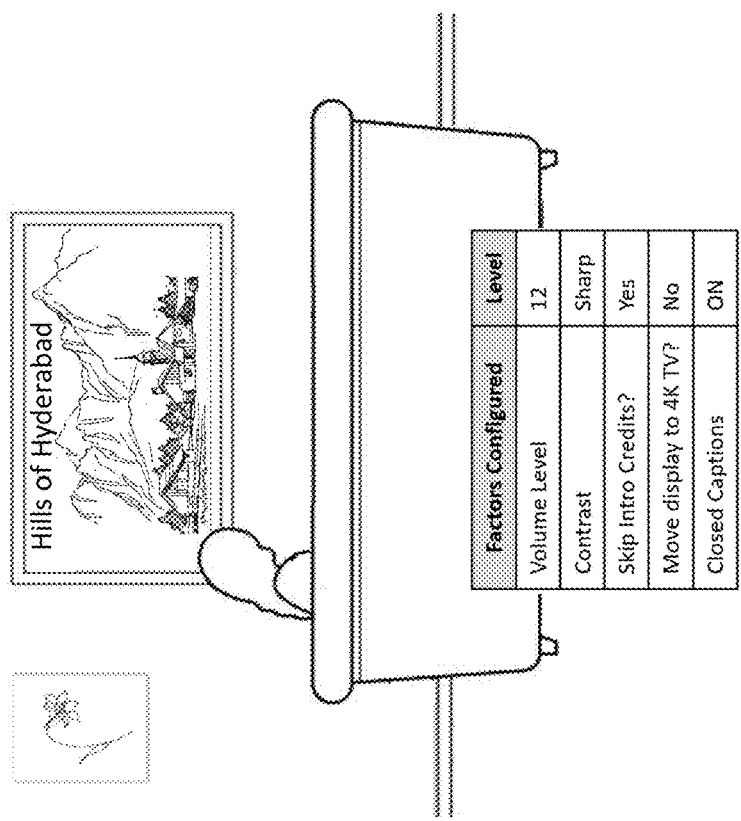
FIG. 14A depicts a first individual consuming a media asset, in accordance with some embodiments of the disclosure.

As depicted in FIGS. 14A and 14B, the system may have different recommendations for the same media asset, "Hills of Hyderabad," based on which user is consuming the media asset. For example, media device configurations for the individual consuming the media asset in FIG. 14A include a volume level at 12, contrast at sharp, approval of skipping introductory credits, rejection of watching the media asset on a 4K TV, and preference of having the closed captions ON while the media asset is being displayed.

Since the system personalizes the media consumption options based on who is watching the media asset, although the individual consuming the same media asset in FIG. 14B may be part of the same household, the media device may be configured with different factors than those configured for user in FIG. 14A. As depicted, the user in FIG. 14B prefers a higher volume level than the user in FIG. 14A, the user in FIG. 14B prefers a low contract while the user in FIG. 14A prefers a sharper contrast, the user in FIGS. 14A and 14B both prefer skipping the introductory credits, and the user in FIG. 14B prefers to turn OFF captions while the user in FIG. 14A prefers to have them ON.

As depicted in FIGS. 13, 14A and 14B, in one embodiment, the process determines user preferences based on which user is consuming the media asset and personalizes the configurations of the media devices based on the personal preferences. However, when multiple users are consuming the media asset at the same time, such as a family, friends, or co-workers, then the system uses the process as described in FIG. 15 below to determine configuration of the media device.

Figure 15:
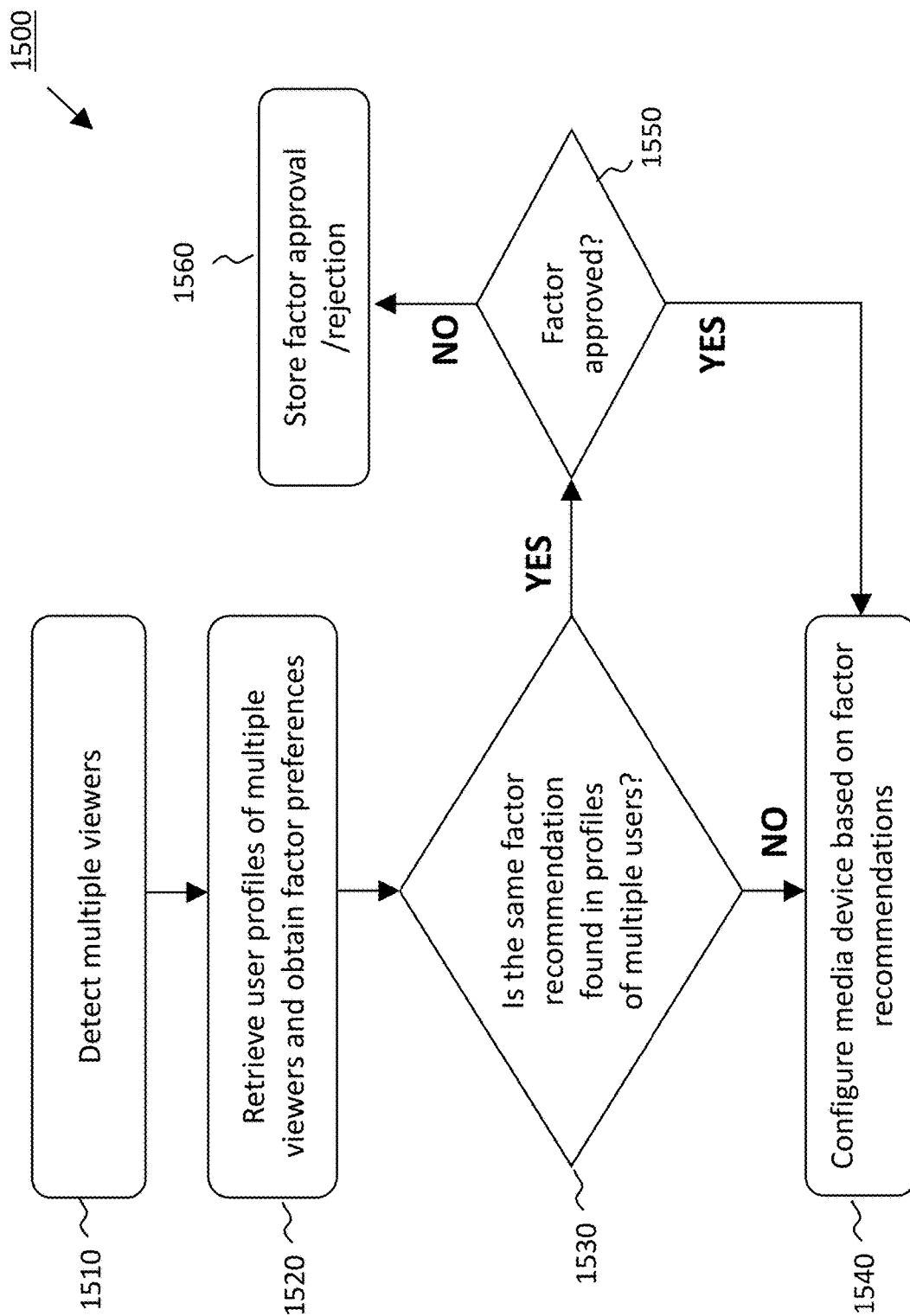
FIG. 15 is a flowchart of a process for configuring a media device when multiple users are consuming the media asset, in accordance with some embodiments of the disclosure.

FIG. 15 is a flowchart of a process for configuring a media device when multiple users are consuming the media asset, in accordance with some embodiments of the disclosure. At block 1510, the system detects multiple viewers that are likely to consume the media asset. The system and make such a determination based on either audio or image analysis as discussed in FIG. 13. In another embodiment, the users may also self-identify to the system which users are going to be consuming the media asset.

At block 1520, based on the identification, the system access user profiles of the multiple viewers that are consuming or will be consuming the media asset. For simplification, only two users are discussed in this example, however process also applies to multiple users consuming the media asset at the same time.

At block 1530, in an embodiment where two users are consuming the media asset, the system determines if a same factor has been recommended for both users. For example, does the first and the second user have a recommendation for volume. If the same factor is not recommended for both users, then the system may configure the media device such that recommendations for both the first user and the second user are accommodated. For example, the first user has a recommendation for volume and the second user does not have a recommendation for volume and the first user does not have a recommendation for brightness, but the second user has a recommendation for brightness, as such the system would configure the volume preferences for the first user and the brightness preferences for the second user thereby displaying the media assed with the volume and brightness configured to their preferences respectively.

However, at block 1530, if the system detects that the same factor has different recommendations for the first user and the second user, then the system determines that it conflict exists for configuring that particular factor. When the system determines the conflict, the system transmits for display a selectable option that includes the preferences of both the first user and the second user. The users consuming the media asset may select one of the two consumption options displayed or decide to reject both options.

The system receives the selection made by the multiple users watching the media asset. As mentioned above the multiple users may select it consumption option that is preferred by either the first user or the second user or reject both options. At block 1540, the system configures the media device based on the selection received. The system also stores each approval and rejection such that the data can be used in building a machine learning model. When the same set of users are consuming a subsequent media asset, the machine learning model may be used to apply previously accepted consumption options.

Figure 16:
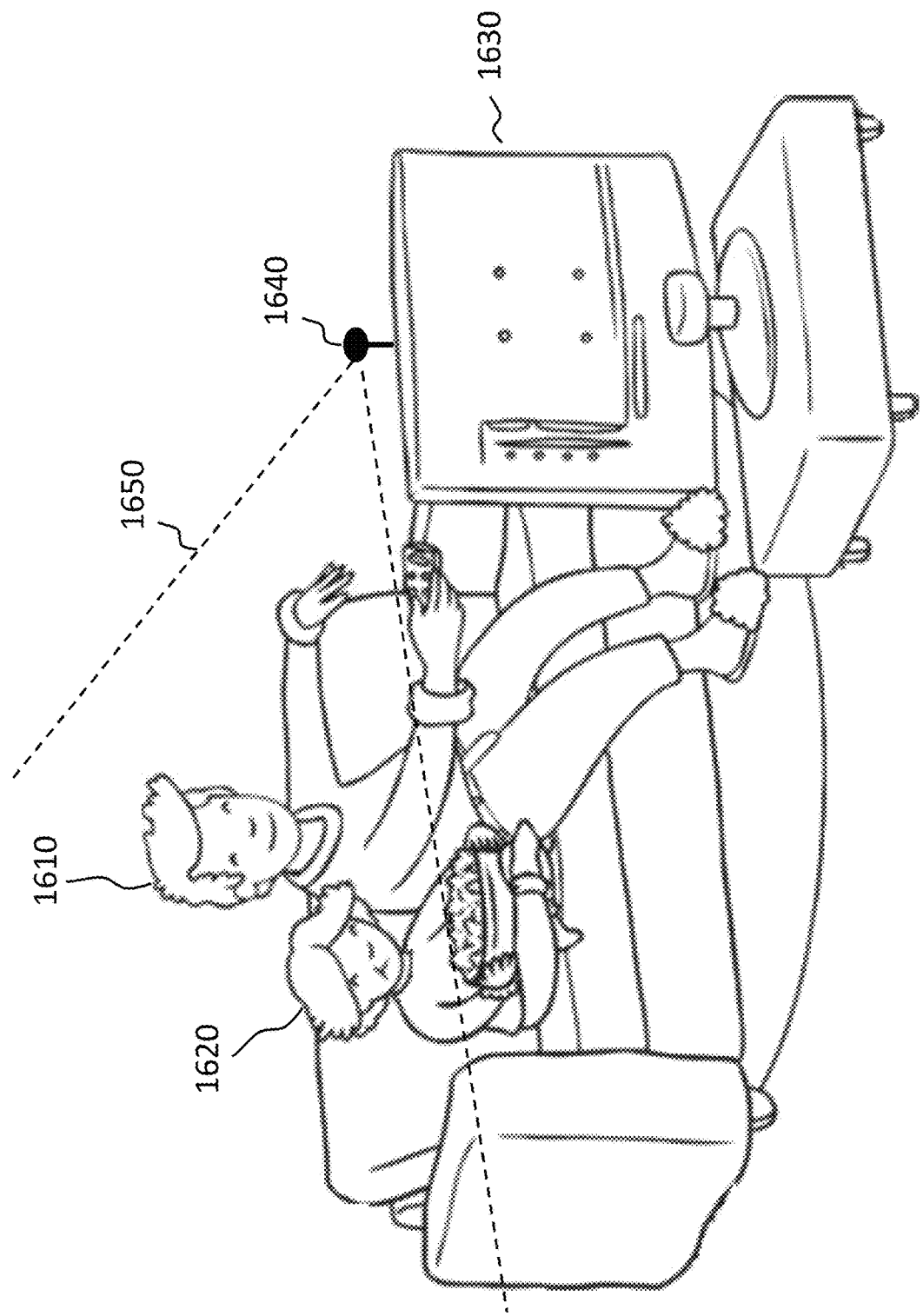
FIG. 16 depicts an adult and a child consuming a media asset, in accordance with some embodiments of the disclosure.

FIG. 16 depicts an adult and a child consuming a media asset, in accordance with some embodiments of the disclosure. In one embodiment, the multiple users that are consuming a media asset may include an adult 1610 and a child 1620. The system may activate the media device 1630 camera 1630 and capture an add image within the field of view 1650 of the camera 1640. the system may perform image analysis and use artificial intelligence (AI) algorithms to determine that a child is consuming the media asset. The system may also perform audio analysis, as described in FIG. 13, to identify that a child is consuming the media asset. Based on the determination that a child is consuming the media asset, the system may automatically turn ON parental controls such that consumption options that are not suitable for a child are disabled and not displayed.

It will be apparent to those of ordinary skill in the art that methods involved in the above-mentioned embodiments may be embodied in a computer program product that includes a computer-usable and/or -readable medium. For example, such a computer-usable medium may consist of a read-only memory device, such as a CD-ROM disk or conventional ROM device, or a random-access memory, such as a hard drive device or a computer diskette, having a computer-readable program code stored thereon. It should also be understood that methods, techniques, and processes involved in the present disclosure may be executed using processing circuitry.

The processes discussed above are intended to be illustrative and not limiting. More generally, the above disclosure is meant to be exemplary and not limiting. Only the claims that follow are meant to set bounds as to what the present invention includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

The invention claimed is:

1. A method comprising:
identifying a plurality of recommendations posted by a plurality of users on online platforms for configuring a plurality of media device settings of a media device for playing a media asset;
grouping the plurality of recommendations into pairs;
calculating a recommendation score for each pair;
selecting a pair with the highest recommendation score; and
configuring the media device settings based on the recommendations associated with the selected pair.

2. The method of claim 1, wherein, calculating a recommendation score for each pair further comprises:
identifying distinct pairs within the grouping, wherein each distinct pair includes a distinct combination of media device setting recommendations that are not available in other identified pairs; and
calculating the recommendation score for each distinct pair.

3. The method of claim 1, further comprising retaining recommendations for the distinct pair, from the plurality of recommendations for each pair, that meets the threshold value.

4. The method of claim 1, further comprising discarding recommendations for the distinct pair, from the plurality of recommendations for each pair, that does not meet the threshold value.

5. The method of claim 1, further comprising:
accessing the media device capabilities to determine whether a recommendation in the selected pair is offered as a configuration option in the media device; and
in response to determining that the configuration option is not offered in the media device:
not presenting the selected pair as a recommendation option.

6. The method of claim 1, wherein the plurality of recommendations is obtained from a plurality of comments on the online platforms.

7. The method of claim 1, wherein the calculating the recommendation score for each pair comprises:
determining a quantity of users that made the same combination of recommendations that are in the pair; and
compiling the determined quantity to obtain a count for each pair.

8. The method of claim 1, wherein the recommendations for configuring a plurality of media device settings are selected from a group consisting of brightness, volume, picture-in-picture, playback speed, captions ON/OFF, display resolution, and parental controls ON/OFF.

9. The method of claim 1, wherein identifying the plurality of recommendations posted by the plurality of online platforms for configuring the plurality of media device settings is performed if the plurality of recommendation exceeds a threshold number of recommendations.

10. The method of claim 9, further comprising:
determining that the plurality of recommendation do not exceed the threshold number of recommendations; and
in response to the determination:
crowd sourcing for additional recommendations; and
determining that the threshold has been met when the plurality of recommendation and additional recommendations obtained from crowd sourcing have exceeded the threshold.

11. The method of claim 10, wherein crowd sourcing is performed by transmitting a survey to a group of users, wherein the survey queries the group of users whether they would recommend a particular media device configuration for a media asset.

12. The method of claim 10, wherein the plurality of recommendations posted by the plurality of users are related to configuring the media device settings of the media device for consuming a same media asset by a current user that has been consumed by the plurality of users.

13. A system comprising:
communication circuitry configured to access a media device; and
control circuitry configured to:
identify a plurality of recommendations posted by a plurality of users on online platforms for configuring a plurality of media device settings of a media device for playing a media asset;
group the plurality of recommendations into pairs;

calculate a recommendation score for each pair;
select a pair with the highest recommendation score; and
configure the media device settings based on the recommendations associated with the selected pair.

14. The system of claim 13, wherein, calculating a recommendation score for each pair further comprises, the control circuitry configured to:
identify distinct pairs within the grouping, wherein each distinct pair includes a distinct combination of media device setting recommendations that are not available in other identified pairs; and
calculate the recommendation score for each distinct pair.

15. The system of claim 13, further comprising, the control circuitry configured to:
access the media device capabilities to determine whether a recommendation in the selected pair is offered as a configuration option in the media device; and
in response to determining that the configuration option is not offered in the media device: not present the selected pair as a recommendation option.

16. The system of claim 13, wherein the calculating the recommendation score for each pair comprises, the control circuitry configured to:
determine a quantity of users that made the same combination of recommendations that are in the pair; and
compile the determined quantity to obtain a count for each pair.

17. The system of claim 13, wherein the recommendations for configuring a plurality of media device settings are selected by the control circuitry from a group consisting of brightness, volume, picture-in-picture, playback speed, captions ON/OFF, display resolution, and parental controls ON/OFF.

18. The system of claim 13, wherein identifying the plurality of recommendations posted by the plurality of online platforms for configuring the plurality of media device settings is performed by the control circuitry if the plurality of recommendation exceeds a threshold number of recommendations.

19. The system of claim 18, further comprising, the control circuitry configured to:
determine that the plurality of recommendation do not exceed the threshold number of recommendations; and
in response to the determination:
crowd source for additional recommendations; and
determine that the threshold has been met when the plurality of recommendation and additional recommendations obtained from crowd sourcing have exceeded the threshold.

20. The system of claim 19, wherein crowd sourcing is performed by the control circuitry by transmitting a survey to a group of users, wherein the survey queries the group of users whether they would recommend a particular media device configuration for a media asset.

* * * * *